United States Patent
Mei et al.

(10) Patent No.: US 10,796,187 B1
(45) Date of Patent: Oct. 6, 2020

(54) DETECTION OF TEXTS

(71) Applicant: NEXTVPU (SHANGHAI) CO., LTD., Shanghai (CN)

(72) Inventors: Song Mei, Shanghai (CN); Haijiao Cai, Shanghai (CN); Xinpeng Feng, Shanghai (CN); Ji Zhou, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/554,310

(22) Filed: Aug. 28, 2019

Related U.S. Application Data

(63) Continuation of application No. PCT/CN2019/099015, filed on Aug. 2, 2019.

(30) Foreign Application Priority Data

Jun. 10, 2019 (CN) .......................... 2019 1 0494385

(51) Int. Cl.
*G06K 9/46* (2006.01)

(52) U.S. Cl.
CPC ........... *G06K 9/46* (2013.01); *G06K 2209/01* (2013.01)

(58) Field of Classification Search
None
See application file for complete search history.

(56) References Cited

U.S. PATENT DOCUMENTS

| | | |
|---|---|---|
| 2006/0017752 A1 | 1/2006 | Kurzweil et al. |
| 2008/0063276 A1* | 3/2008 | Vincent .................. G06K 9/03 382/182 |
| 2011/0123115 A1* | 5/2011 | Lee ........................ G06K 9/036 382/185 |
| 2011/0145883 A1* | 6/2011 | Godar .................... H04N 5/445 725/131 |
| 2016/0140108 A1* | 5/2016 | Lee ....................... G06F 3/04842 715/728 |
| 2017/0235705 A1* | 8/2017 | Wezorek ................ G06Q 50/16 715/229 |
| 2018/0039847 A1 | 2/2018 | Nishio |

FOREIGN PATENT DOCUMENTS

| | | |
|---|---|---|
| CN | 104424472 A | 3/2015 |
| CN | 107393356 A | 11/2017 |
| CN | 107992867 A | 5/2018 |

(Continued)

*Primary Examiner* — Kevin Ky
(74) *Attorney, Agent, or Firm* — Kilpatrick Townsend & Stockton LLP

(57) ABSTRACT

The present disclosure relates to detection of texts. A text detecting method includes: acquiring a first image to be detected of a text object to be detected; determining whether the first image to be detected contains a predetermined indicator; determining, if the first image to be detected contains the predetermined indicator, a position of the predetermined indicator, and acquiring a second image to be detected of the text object to be detected; determining whether the second image to be detected contains the predetermined indicator; and determining, if the second image to be detected does not contain the predetermined indicator, a text detecting region based on the position of the predetermined indicator.

19 Claims, 14 Drawing Sheets

(56) References Cited

FOREIGN PATENT DOCUMENTS

| | | | |
|---|---|---|---|
| CN | 108875694 | A | 11/2018 |
| CN | 109325464 | A | 2/2019 |
| CN | 110032994 | | 7/2019 |
| JP | 11203403 | A | 7/1999 |
| JP | 2014063318 | A | 4/2014 |
| KR | 20180008853 | A | 1/2018 |
| WO | 1999021122 | | 4/1999 |
| WO | 2016092656 | A1 | 6/2016 |

* cited by examiner

DETECTION OF TEXTS

CROSS-REFERENCES TO RELATED APPLICATIONS

This application claims priority to and is a continuation of International Patent Application No. PCT/CN2019/099015, filed Aug. 2, 2019; which claims priority from Chinese Patent Application No. CN 201910494385.4, filed Jun. 10, 2019, the entire contents of which are incorporated by reference herein in their entirety for all purposes.

TECHNICAL FIELD

The present disclosure relates to the field of data processing, and in particular to a text detecting method, a reading assisting device and a non-transitory computer readable storage medium.

DESCRIPTION OF THE RELATED ART

Text-related data processing may include detection and recognition of texts. Although current text-related data processing techniques are widely used in various fields, the accuracy of text detection still needs to be improved.

Methods described in this section are not necessarily the methods that have been previously conceived or employed. Unless otherwise expressly indicated, it should not be assumed that any of the methods described in this section are considered to be the prior art just because they are included in this section. Similarly, the problems mentioned in this section should not be considered to be universally recognized in any prior art, unless otherwise indicated expressly.

BRIEF SUMMARY OF THE INVENTION

According to an aspect of the present disclosure, a computer-implemented text detecting method is provided, including the following steps executed by a processor: acquiring a first image to be detected of a text object to be detected; determining whether the first image to be detected contains a predetermined indicator; determining, if the first image to be detected contains the predetermined indicator, a position of the predetermined indicator, and acquiring a second image to be detected of the text object to be detected; determining whether the second image to be detected contains the predetermined indicator; and determining, if the second image to be detected does not contain the predetermined indicator, a text detecting region based on the position of the predetermined indicator.

According to another aspect of the present disclosure, a reading assisting device is provided, including: an image sensor for capturing a first image to be detected and a second image to be detected, of a text object to be detected; a processor; and a memory for storing a program, the program comprising instructions that, when executed by the processor, cause the processor to: acquire the first image to be detected, captured by the image sensor, of the text object to be detected; determine whether the first image to be detected contains a predetermined indicator; determine, if the first image to be detected contains the predetermined indicator, a position of the predetermined indicator, and acquire the second image to be detected, captured by the image sensor, of the text object to be detected; determine whether the second image to be detected contains the predetermined indicator; and, determine, if the second image to be detected does not contain the predetermined indicator, a text detecting region based on the position of the predetermined indicator.

According to another aspect of the present disclosure, a non-transitory computer readable storage medium storing a program is provided, the program including instructions that, when executed by a processor of an electronic device, cause the electronic device to execute the method according to the present disclosure.

BRIEF DESCRIPTION OF THE DRAWINGS

The accompanying drawings exemplarily show embodiments and constitute a part of the specification for interpreting exemplary implementations of the embodiments, together with the description in the specification. The embodiments shown are merely for illustrative purposes and do not limit the scope of claims. In all the figures, the same reference signs refer to similar but not necessarily identical elements.

DETAILED DESCRIPTION OF THE INVENTION

In the present disclosure, unless otherwise stated, the terms "first", "second", etc., used to describe various elements are not intended to limit the positional, temporal or importance relationship of these elements, but rather only to distinguish one component from the other. In some examples, the first element and the second element may point to the same instance of the elements, and in some cases, based on contextual descriptions, they may also refer to different instances.

The terms used in the description of the various examples in the present disclosure are merely for the purpose of describing particular examples, and are not intended to be limiting. Unless the context clearly indicates otherwise, if the number of elements is not specifically defined, the number of the elements may be one or more. Moreover, the term "and/or" used in the present disclosure encompasses any of and all possible combinations of listed items.

For the detection and recognition of texts, it is desirable to accurately find, from a text-containing object to be detected, a region where text detection is to be performed and perform recognition. In some applications where text detection and recognition are needed, a user interaction process may be involved. For example, a user may point to a region desired for text detection and recognition in an object to be detected.

According to embodiments of the present disclosure, an improved text detecting method is provided, which can improve the accuracy of text detection. Exemplary embodiments of the text detecting method of the present disclosure will be further described below with reference to the accompanying drawings.

Figure 1:
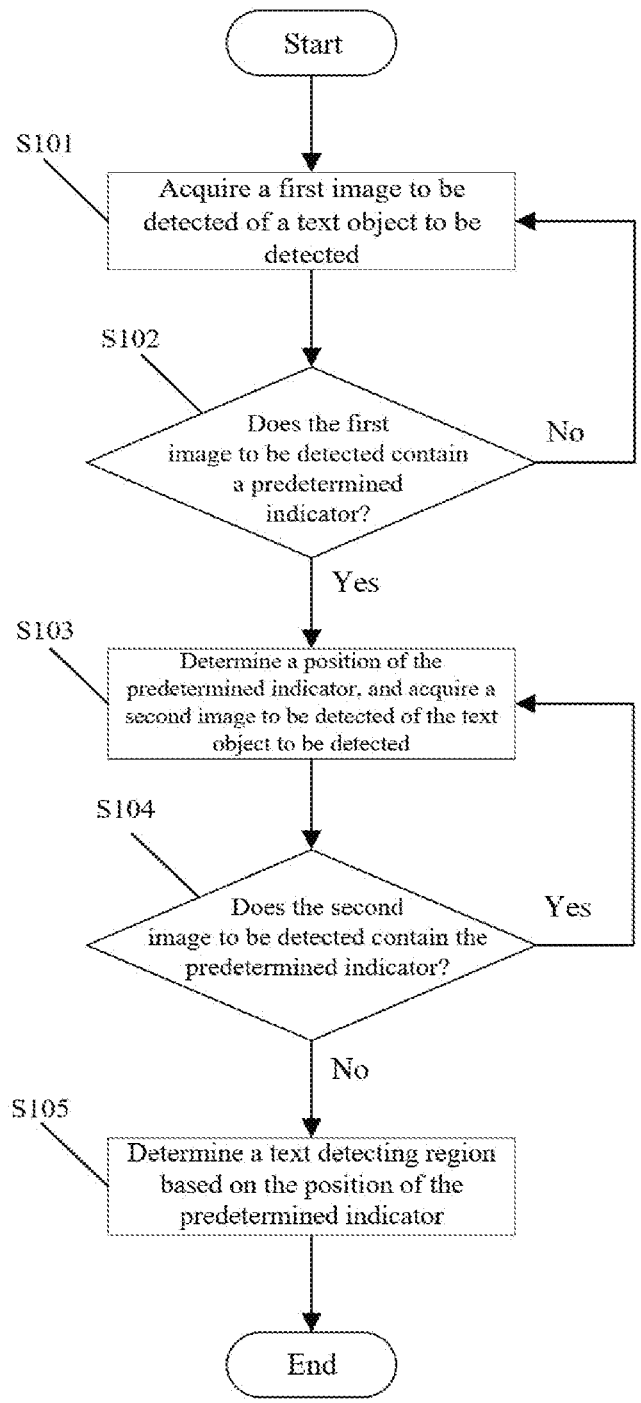
FIG. 1 is a flow chart showing a text detecting method according to an exemplary embodiment of the present disclosure.

FIG. 1 is a flow chart showing a text detecting method according to an exemplary embodiment of the present disclosure. As shown in FIG. 1, the text detecting method may comprise, for example, the following steps executed by a processor.

In step S101, a first image to be detected of a text object to be detected is acquired.

The text object to be detected may be any text-containing object on which text detection is desired by a user, e.g., a book, a newspaper, a screen, a menu, a logo, etc. The text object to be detected may be pointed, for example, by the user using a predetermined indicator. The predetermined indicator may be an object having an indicating property, e.g., a stylus, a pointer, a fingertip or fingernail of a user's finger, etc.

The first image to be detected of the text object to be detected may be acquired in various ways. For example, the first image to be detected, that is captured by photographing with a camera or a photographing device, may be acquired. Or the first image to be detected, that is captured by photographing with a camera device or a device with a photographing function (e.g., a mobile phone, a tablet computer, a wearable device, a reading assisting device, etc.), may be acquired. The first image to be detected may also be obtained from other sources, for example, from other image capturing devices. Of course, the first image to be detected may also be an existing image, that is, an image that has been captured and saved. This is not limited in the present disclosure.

In step S102, it is determined whether the first image to be detected contains a predetermined indicator.

Since the text object to be detected can be pointed by the user using the predetermined indicator so as to indicate a region where text detection is desired by the user, it is determined in this step whether the acquired first image to be detected contains the predetermined indicator.

Various existing algorithms can be used to determine whether the first image to be detected contains the predetermined indicator. For example, an algorithm from OpenCV, e.g., a CascadeClassifier function in OpenCV (https://docs.opencv.org/3.2.0/d1/de5/classcv_1_1CascadeClassifier.html) can be used to determine whether the first image to be detected contains the predetermined indicator.

Figure 2:
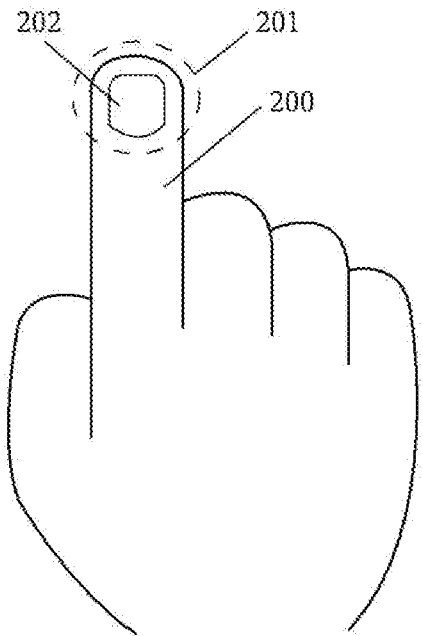
FIG. 2 is a schematic diagram showing a fingertip portion or a fingernail of a user's finger as a predetermined indicator according to an exemplary embodiment of the present disclosure.

According to an exemplary embodiment, the predetermined indicator is a fingertip portion or a fingernail of a user's finger. In this case, skin color information of the user can be further used to determine whether the first image to be detected contains the predetermined indicator. FIG. 2 shows a schematic diagram of a fingertip portion or a fingernail of a user's finger as a predetermined indicator according to an exemplary embodiment of the present disclosure. As shown in FIG. 2, the predetermined indicator in an image to be detected may be, for example, a fingertip portion 201 or a fingernail 202 of a user's finger 200. Since the predetermined indicator to be determined or detected in the image to be detected is the fingertip portion or the fingernail of the user's finger, not the entire finger, the region to be detected is relatively small, and thus the change in angle between the finger and the text object to be detected does not have a significant impact on determination of the predetermined indicator in the image to be detected. Further, an existing algorithm, such as the algorithm from OpenCV, may be combined with the skin color information of the user, and the determining or detecting result of the user's finger is further corrected by using the skin color information of the user. In this way, the user's finger may be determined and detected in the cases where there are various different angles between the user's finger and the text object to be detected, without the need that the user's finger must be perpendicular to the text object to be detected. In other words, it is ensured that the finger is accurately recognized without being affected by the position of the finger, which facilitates improving the user experience.

According to an exemplary embodiment, if it is determined that the first image to be detected does not contain the predetermined indicator, an image to be detected of the text object to be detected may be acquired again. In other words, there may be a plurality of first images to be detected of the text object to be detected. According to this exemplary embodiment, the image to be detected of the text object to be detected may be repeatedly acquired through steps S101 and S102 until the acquired image to be detected contains the predetermined indicator.

In step S103, if the first image to be detected contains the predetermined indicator, a position of the predetermined indicator is determined, and a second image to be detected of the text object to be detected is acquired.

If it has been determined that the first image to be detected contains the predetermined indicator, the position of the predetermined indicator is determined. As described above, the position of the predetermined indicator may be determined by using various existing algorithms. For example, the position of the predetermined indicator may be determined by using the algorithm from OpenCV, e.g., the CascadeClassifier function in OpenCV (https://docs.opencv.org/3.2.0/d1/de5/classcv_1_1CascadeClassifier.html).

After the position of the predetermined indicator is determined, the second image to be detected of the text object to be detected may be acquired. The second image to be detected may be acquired in a similar manner to that of acquiring the first image to be detected. For example, the second image to be detected, that is captured by photographing with a camera or a photographing device may be acquired. Or the second image to be detected, that is captured by photographing with a camera device or a device with a photographing function (e.g., a mobile phone, a tablet computer, a wearable device, a reading assisting device, etc.), may be acquired. The second image to be detected may also be obtained from other sources, for example, from other image capturing devices.

According to an exemplary embodiment, after the position of the predetermined indicator is determined, the second image to be detected of the text object to be detected is acquired after a predetermined time period. For example, after the position of the predetermined indicator is determined, the second image to be detected of the text object to be detected is acquired after 1.5 seconds. Although the second image to be detected of the text object to be detected may be acquired immediately after the position of the predetermined indicator is determined, it may be advantageous to have a predetermined time period between the two actions in some applications. For example, in the case where the user performs text detection and recognition by using a wearable device or a reading assisting device, the resource waste caused by continuous acquisition of images may be avoided by setting a predetermined time interval between determining the position of the predetermined indicator, such as the user's finger, and acquiring the second image to be detected of the text object to be detected, because the user's finger is likely to remain stationary within a certain time period.

In step S104, it is determined whether the second image to be detected contains the predetermined indicator.

Similar to the situation of determining whether the first image to be detected contains the predetermined indicator, various existing algorithms can be used to determine whether the second image to be detected contains the predetermined indicator. As described above, the skin color information of the user can be further used to determine whether the second image to be detected contains the predetermined indicator, so that the user's finger is determined and detected in the cases where there are various different angles between the user's finger and the object to be detected.

According to an exemplary embodiment, if it is determined that the second image to be detected contains the predetermined indicator, the image to be detected of the text object to be detected may be acquired again. In other words, there may be a plurality of second images to be detected of the text object to be detected. According to this exemplary embodiment, the image to be detected of the object to be detected may be repeatedly acquired through steps S103 and S104 until the acquired image to be detected does not contain the predetermined indicator. More specifically, if it is determined that the second image to be detected contains the predetermined indicator, a position of the predetermined indicator is determined, and another second image to be detected of the text object to be detected is acquired again. If the another second image to be detected acquired again still contains the predetermined indicator, the position of the predetermined indicator is determined again; and if the another second image to be detected acquired again does not contain the predetermined indicator, a text detecting region is determined based on the previously determined position of the predetermined indicator. In other words, if the predetermined indicator has been moved but the moved predetermined indicator is still located within a detecting region of an image capturing device, the position of the predetermined indicator is updated. If the predetermined indicator has been moved but the moved predetermined indicator is located outside the detecting region of the image capturing device, the position of the predetermined indicator is not updated, and a text detecting region is determined based on the previously determined position of the predetermined indicator. This exemplary embodiment may be particularly advantageous in certain applications. For example, in the case where a user performs text detection and recognition by using a wearable device or a reading assisting device, the position of the predetermined indicator used by the user, such as of a user's finger, may have a change, e.g., small displacement or jitter. In this case, by continuously updating the position of the predetermined indicator, a position of the predetermined indicator, such as a user's finger, before leaving the object to be detected, can be determined more accurately, thereby facilitating the accurate determination of the region where text detection and recognition are desired by the user.

In step S105, if the second image to be detected does not contain the predetermined indicator, a text detecting region is determined based on the position of the predetermined indicator.

If the second image to be detected does not contain the predetermined indicator, it may be determined that the predetermined indicator has left the text object to be detected. Therefore, a text detecting region related to the position of the predetermined indicator may be determined in the second image to be detected, based on the previously determined position of the predetermined indicator. The text detecting region is a region where text detection is to be performed in the text object to be detected, that is pointed by the predetermined indicator.

The text detecting region may be determined based on the position of the predetermined indicator in various ways. According to an exemplary embodiment, the text detecting region may be determined by: converting the second image to be detected that does not contain the predetermined indicator into an image containing tone information, wherein pixels in the image containing the tone information respectively have corresponding tone values; comparing the tone values of the pixels with a preset tone value range to obtain at least one pixel block consisting of pixels having tone values within the preset tone value range; selecting, from the at least one pixel block, a pixel block containing the position of the predetermined indicator; and determining the text detecting region according to the position of the predetermined indicator in the selected pixel block. The method for determining the text detecting region is not limited to that described above, and may also be implemented, for example, by using an exemplary method shown in FIG. 3 as described below.

In the text detecting method according to an exemplary embodiment of the present disclosure as described above, an image of the text object to be detected may be acquired again after the predetermined indicator (e.g., a stylus, a pointer, a user's finger, etc.) leaves the text object to be detected, and therefore, text that may be covered by the predetermined indicator otherwise, will not exist in the image acquired again. Then, the text detecting region is determined based on the previously determined position of the predetermined indicator. Thus, the accuracy of text detection can be improved.

The text detecting method according to an exemplary embodiment of the present disclosure has been described above with reference to FIG. 1. Exemplary embodiments of the steps in the method, as well as other embodiments, will be further described in detail below with reference to FIGS. 3-11. It should be noted that various definitions, embodiments, implementations, examples and the like described above with reference to FIG. 1 may also be applied to or combined with the exemplary embodiments described later.

Figure 3:
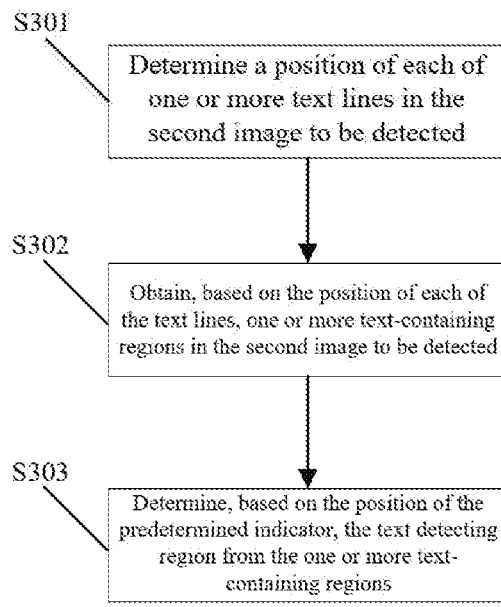
FIG. 3 is a flow chart showing a method for determining a text detecting region based on the position of the predetermined indicator according to an exemplary embodiment of the present disclosure.
Figure 4:
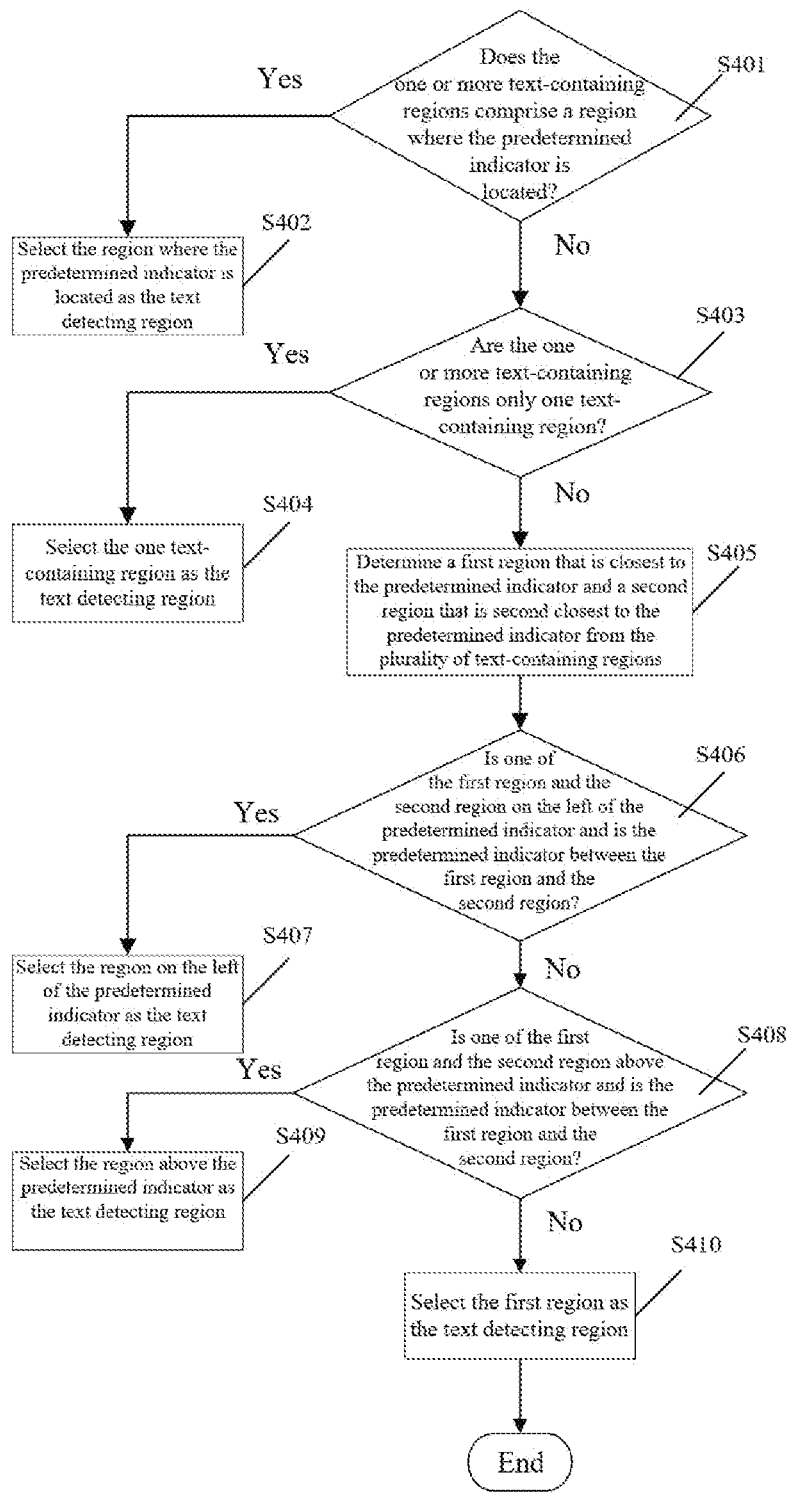
FIG. 4 is a flow chart showing an exemplary method for determining a text detecting region based on the position of the predetermined indicator from one or more text-containing regions, according to an exemplary embodiment of the present disclosure.
Figure 6:
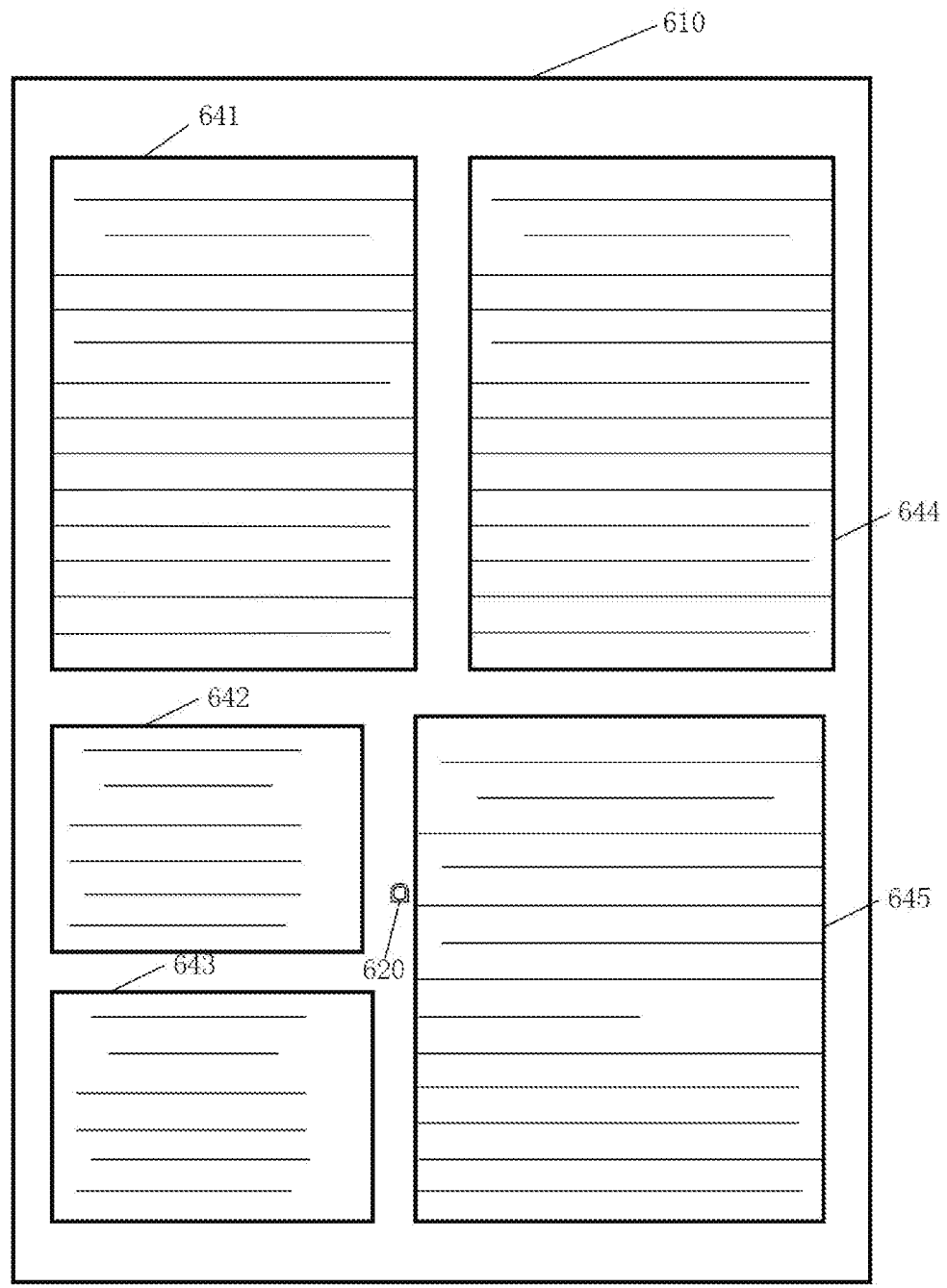
FIGS. 6-8 are schematic diagrams for determining a text detecting region based on the position of the predetermined indicator according to different exemplary embodiments of the present disclosure.
Figure 7:
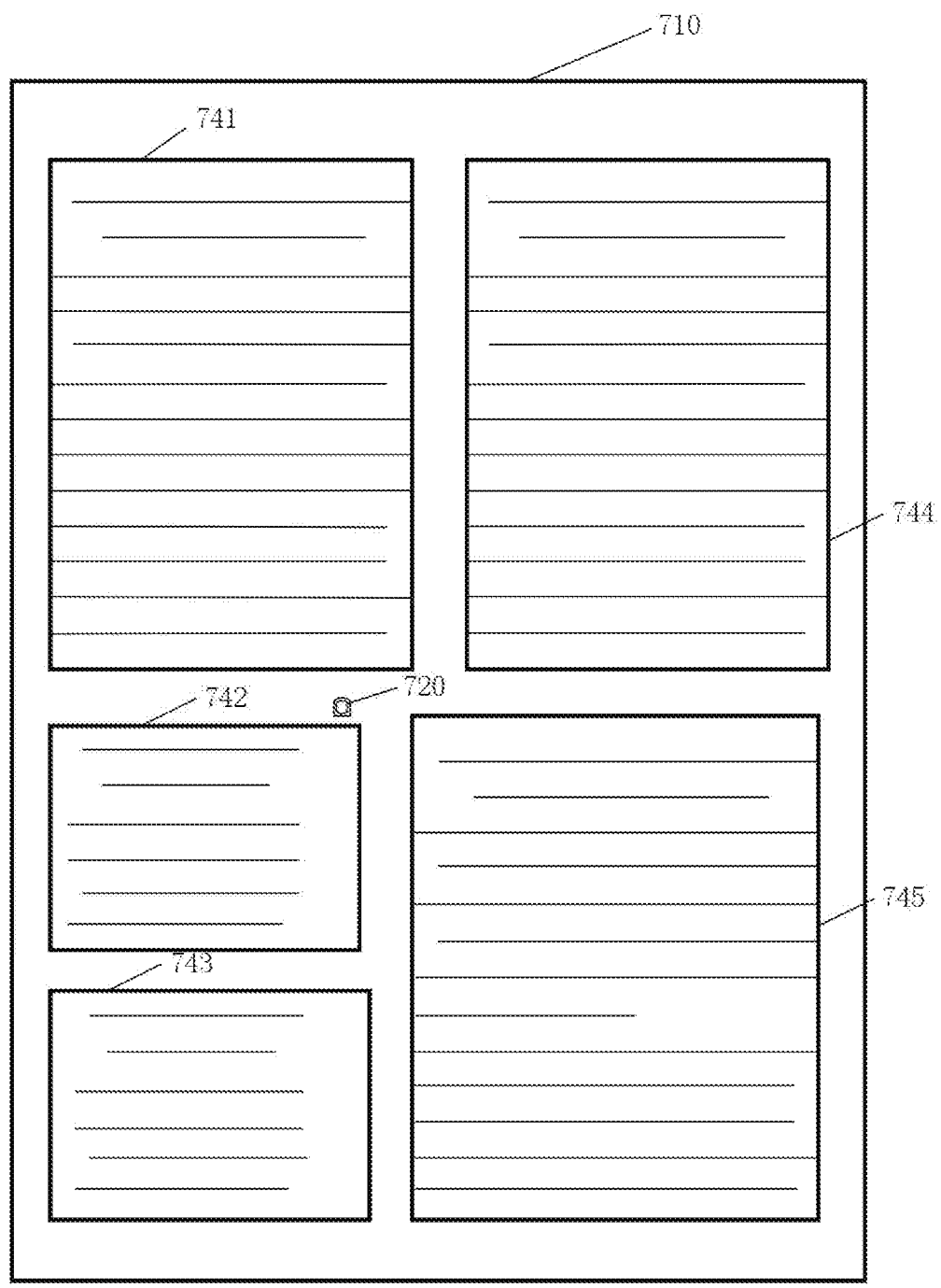
Figure 8:
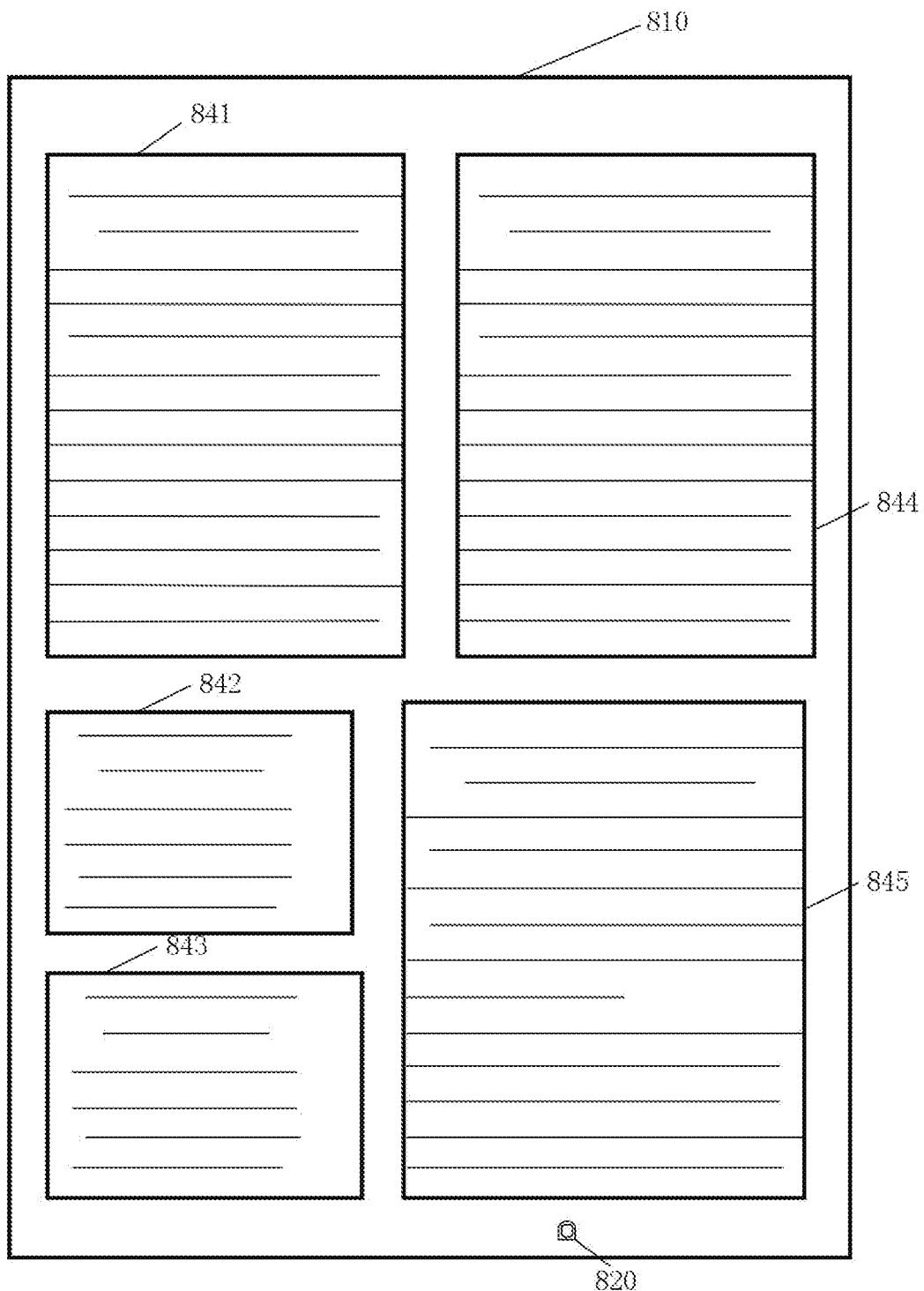

FIG. 3 is a flow chart showing an exemplary method for determining a text detecting region based on the position of the predetermined indicator according to an exemplary embodiment of the present disclosure. FIG. 4 is a flow chart showing an exemplary method for determining a text detecting region based on the position of the predetermined indicator from one or more text-containing regions, according to an exemplary embodiment of the present disclosure. FIGS. 5A-5D are schematic diagrams for determining a text detecting region based on the position of the predetermined indicator according to an exemplary embodiment of the present disclosure. FIGS. 6-8 are schematic diagrams for determining a text detecting region based on the position of the predetermined indicator according to different exemplary embodiments of the present disclosure.

As shown in FIG. 3, in step S301, a position of each of one or more text lines in the second image to be detected is determined.

In this step, if there are one or more text lines in the second image to be detected, the position of each of the text lines may be determined. The position of each of the text lines may be represented, for example, by position coordinates of an outer virtual box surrounding the text line in the image to be detected.

Figure 5A:
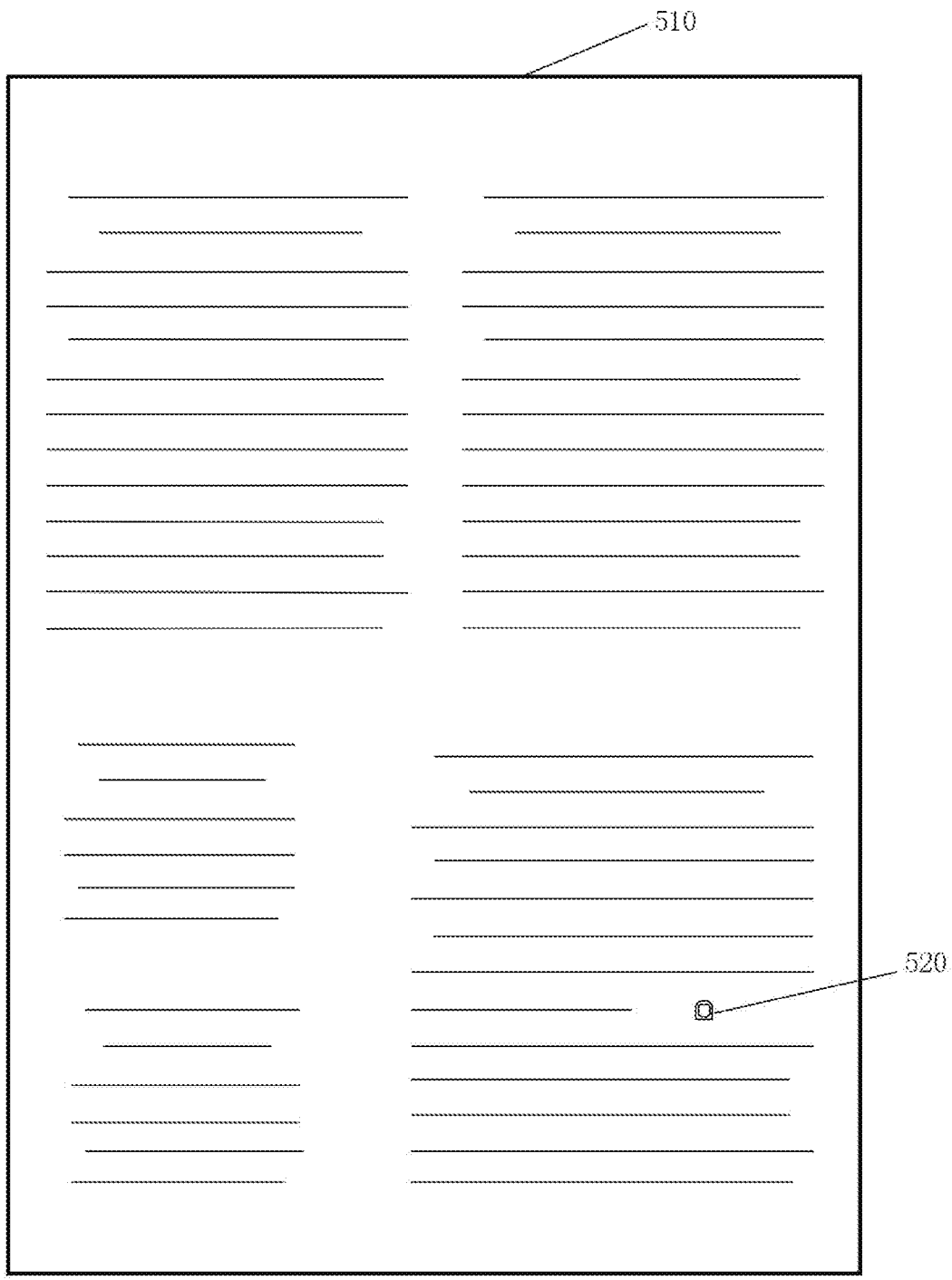
FIGS. 5A-5D are schematic diagrams for determining a text detecting region based on the position of the predetermined indicator according to exemplary embodiments of the present disclosure.

FIG. 5A schematically shows an image to be detected of a text object to be detected 510, and the text object to be detected 510 may be, for example, a book or a newspaper. The image to be detected contains a predetermined indicator 520 such as a user's finger.

Figure 5B:
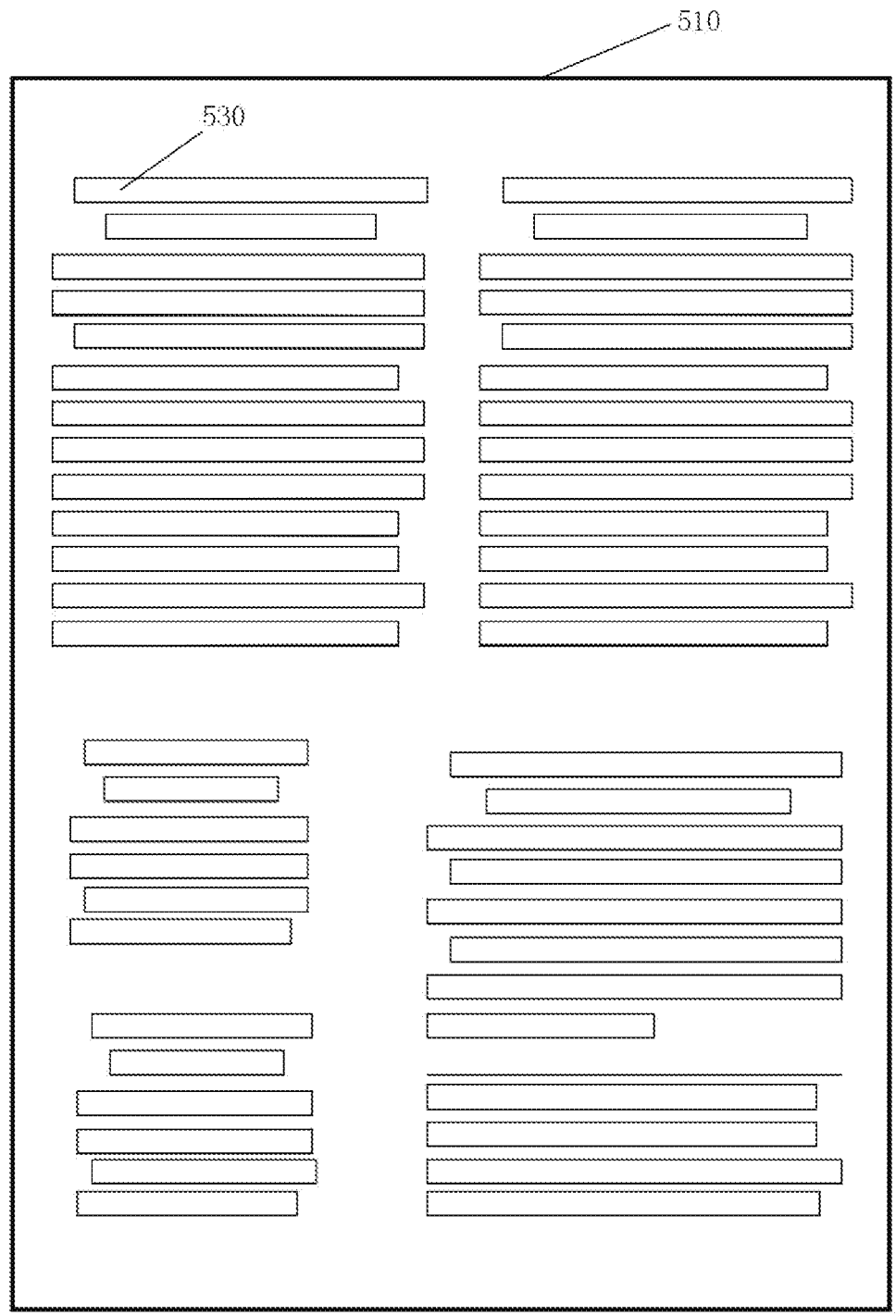

FIG. 5B schematically shows another image to be detected of the text object to be detected 510, and the image to be detected does not contain the predetermined indicator 520. As shown in FIG. 5B, the position of each of the one or more text lines in the image to be detected is determined. In FIG. 5B, each of the text lines is surrounded by a rectangular outer virtual box, and position coordinates of the outer virtual box in the image to be detected may represent the position of the corresponding text line. For example, position coordinates of an outer virtual box surrounding a text line 530 may represent the position of the text line 530. The outer boxes in FIG. 5B are shown to be of a rectangular shape, which is merely exemplary but not a limitation on the present disclosure. The outer virtual box surrounding each text line may also be of any other shape. Moreover, in addition to the outer virtual box, other ways may also be used to represent the position of the text line.

In step S302, one or more text-containing regions in the second image to be detected are obtained based on the position of each of the text lines.

After the position of each of the text lines is determined, text-containing regions in the second image to be detected may be obtained based on the position of each of the text lines. For example, the text lines are clustered and merged by using an existing text clustering method to obtain the one or more text-containing regions.

Figure 5C:
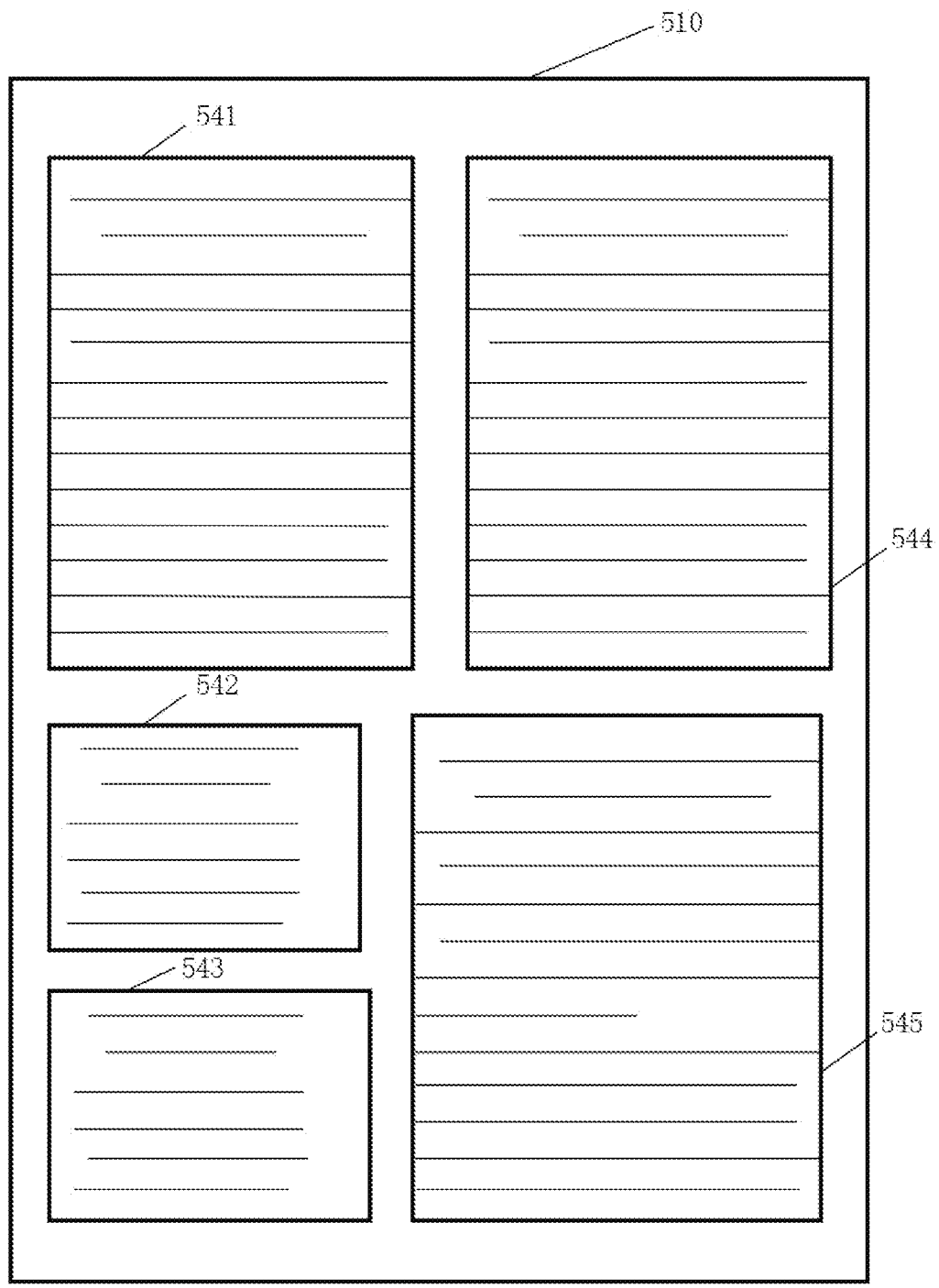

FIG. 5C schematically shows an image to be detected of the text object to be detected 510. As shown in FIG. 5C, a plurality of text-containing regions 541, 542, 543, 544 and 545 in the image to be detected are obtained based on the already determined position of each of the text lines.

In step S303, the text detecting region is determined from the one or more text-containing regions based on the position of the predetermined indicator.

Figure 5D:
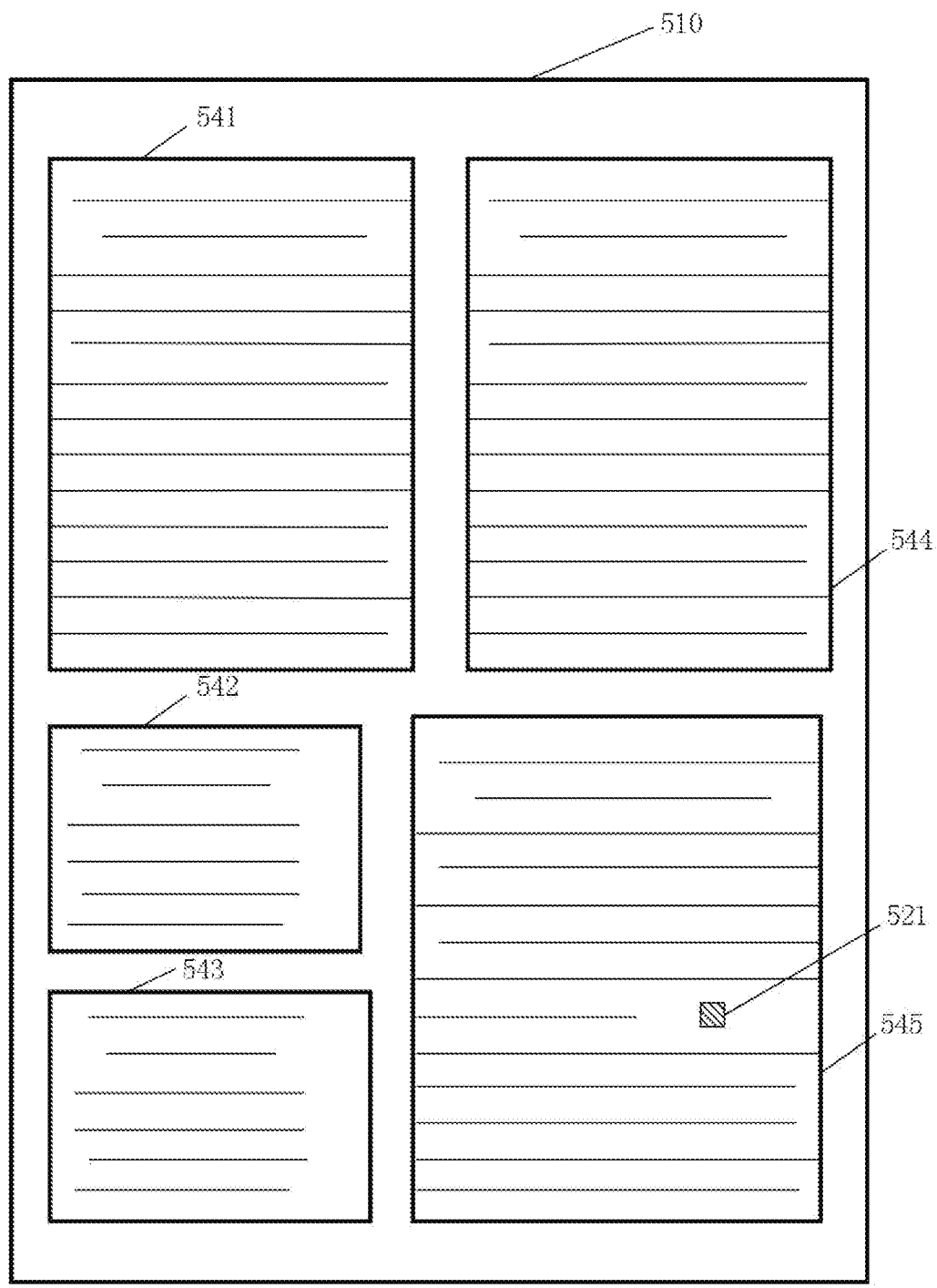

The text detecting region may be determined from the one or more text-containing regions based on the previously determined position of the predetermined indicator. FIG. 5D schematically shows an image to be detected of the text object to be detected 510. As shown in FIG. 5D, the text detecting region 545 is determined, based on a position 521 of the predetermined indicator, from the plurality of text-containing regions 541, 542, 543, 544 and 545 in the image to be detected.

By using the exemplary method as shown in FIG. 3, the text detecting region can be automatically determined based on the already determined position of the predetermined indicator, which facilitates improving the speed of text detection.

FIG. 4 is a flow chart showing an exemplary method for determining a text detecting region based on the position of the predetermined indicator from one or more text-containing regions, according to an exemplary embodiment of the present disclosure.

As shown in FIG. 4, in step S401, it is first determined whether the one or more text-containing regions comprise a region where the predetermined indicator is located. The user may desire to determine, by using a predetermined indicator, such as a finger pointing to the text object to be detected, a region where text detection is desired by the user, but for some reasons, such as unintentional sliding or jitter, or user's own visual impairment (e.g., amblyopia), the predetermined indicator may be not located in the text-containing region but at the other position on the text object to be detected. Therefore, in step S401, it is first determined whether the text-containing regions comprise a region where the predetermined indicator is located.

In step S402, if the one or more text-containing regions comprise a region where the predetermined indicator is located, the region is selected as the text detecting region. In other words, if the predetermined indicator, such as a user's finger, is located in a text-containing region, the region is used as the text detecting region, for example, as shown by the region 545 in FIG. 5D.

If none of the one or more text-containing regions comprises the predetermined indicator, it is determined, in step S403, whether the one or more text-containing regions are only one text-containing region. Depending on the distribution of text content in the text object to be detected, the determined text-containing regions may be only one region instead of a plurality of regions. Therefore, it is determined, in step S403, whether the number of the text-containing regions in the image to be detected is one or more.

In step S404, if the one or more text-containing regions are only one text-containing region, that is, there is only one text-containing region in the image to be detected, the only one text-containing region is selected as the text detecting region.

In step S405, if the one or more text-containing regions comprise a plurality of text-containing regions, that is, there are a plurality of text-containing regions in the image to be detected, a first region that is closest to the predetermined indicator and a second region that is second closest to the predetermined indicator are determined from the plurality of text-containing regions.

Herein, the text-containing region that is closest to the predetermined indicator is such a region that the distance between the boundary of the region and the center of the predetermined indicator is the minimum compared with the corresponding distance between the boundary of each of the other regions and the center of the predetermined indicator. Herein, the text-containing region that is second closest to the predetermined indicator is such a region that, if there are only two text-containing regions in the image to be detected, the region is another region other than the text-containing region that is closest to the predetermined indicator; and if there are more than two text-containing regions in the image to be detected, the distance between the boundary of the region and the center of the predetermined indicator is greater than the distance between the boundary of the region that is closest to the predetermined indicator and the center of the predetermined indicator, but less than the corresponding distance between the boundary of each of the other regions among the more than two text-containing regions and the center of the predetermined indicator.

FIG. 6 is a schematic diagram for determining a text detecting region based on the position of the predetermined indicator according to another exemplary embodiment of the present disclosure. As shown in FIG. 6, there are a plurality of text-containing regions 641, 642, 643, 644 and 645 in an image to be detected of a text object to be detected 610. In this case, the first region 645 that is closest to a predetermined indicator 620 and the second region 642 that is second closest to the predetermined indicator 620 are determined from the plurality of text-containing regions 641, 642, 643, 644 and 645. As described above, the distance between the boundary of the text-containing region 645 that is closest to the predetermined indicator 620 and the center of the predetermined indicator 620 is the minimum compared with the corresponding distance between the boundary of each of the other regions 641, 642, 643 and 644 and the center of the predetermined indicator 620. The distance between the boundary of the text-containing region 642 that is second closest to the predetermined indicator 620 and the center of the predetermined indicator 620 is greater than the distance between the boundary of the region 645 that is closest to the predetermined indicator 620 and the center of the predetermined indicator 620, but less than the corresponding distance between the boundary of each of the other regions 641, 643 and 644 and the center of the predetermined indicator 620.

In step S406, it is determined whether the condition that one of the first region that is closest to the predetermined indicator and the second region that is second closest to the predetermined indicator is on the left of the predetermined indicator and the predetermined indicator is between the first region and the second region is met.

According to usual reading habits, in most cases, users are accustomed to reading from the left to the right of a text object to be detected, such as a book or a newspaper. Therefore, in the case where there are a plurality of text-containing regions in the image to be detected of the text object to be detected, it is further determined whether the predetermined indicator is between two text-containing regions that are closer to the indicator.

For example, in the case as shown in FIG. 6, the condition that one of the first region that is closest to the predetermined indicator and the second region that is second closest to the predetermined indicator is on the left of the predetermined indicator and the predetermined indicator is between the first region and the second region is met, because one of the first region 645 that is closest to the predetermined indicator 620 and the second region 642 that is second closest to the predetermined indicator 620, i.e., the second region 642 is on the left of the predetermined indicator 620 and the predetermined indicator 620 is between the first region 645 and the second region 642.

In step S407, if one of the first region that is closest to the predetermined indicator and the second region that is second closest to the predetermined indicator is on the left of the predetermined indicator and the predetermined indicator is between the first region and the second region, the region on the left of the predetermined indicator is selected as the text detecting region. Therefore, the preferential selection of the region on the left of the predetermined indicator as the text detecting region can better accommodate the reading habit of the user, thereby improving the user experience.

For example, as shown in FIG. 6, one of the first region 645 that is closest to the predetermined indicator 620 and the second region 642 that is second closest to the predetermined indicator 620, i.e., the second region 642 is on the left of the predetermined indicator 620 and the predetermined indicator 620 is between the first region 645 and the second region 642. In this case, the region 642 on the left of the predetermined indicator 620 is selected as the text detecting region, that is, the region on the left of the predetermined indicator 620 is preferentially selected as the text detecting region, which can better accommodate the reading habit of the user.

In step S408, if it is determined that the condition that one of the first region that is closest to the predetermined indicator and the second region that is second closest to the predetermined indicator is on the left of the predetermined indicator and the predetermined indicator is between the first region and the second region is not met, it is determined whether the condition that one of the first region that is closest to the predetermined indicator and the second region that is second closest to the predetermined indicator is above the predetermined indicator and the predetermined indicator is between the first region and the second region is met.

FIG. 7 is a schematic diagram for determining a text detecting region based on the position of the predetermined indicator according to a further exemplary embodiment of the present disclosure. As shown in FIG. 7, there are a plurality of text-containing regions 741, 742, 743, 744 and 745 in an image to be detected of a text object to be detected 710. In this case, the first region 742 that is closest to a predetermined indicator 720 and the second region 741 that is second closest to the predetermined indicator 720 may be determined from the plurality of text-containing regions 741, 742, 743, 744 and 745. As shown in FIG. 7, since the condition that one of the first region 742 and the second region 741 is on the left of the predetermined indicator 720 and the predetermined indicator 720 is between the first region 742 and the second region 741 is not met, it is further determined, in this case, whether the condition that one of the first region 742 that is closest to the predetermined indicator 720 and the second region 741 that is second closest to the predetermined indicator 720 is above the predetermined indicator 720 and the predetermined indicator is between the first region 742 and the second region 741 is met. Obviously, the situation shown in FIG. 7 meets this condition.

In step S409, if one of the first region that is closest to the predetermined indicator and the second region that is second closest to the predetermined indicator is above the predetermined indicator and the predetermined indicator is between the first region and the second region, the region above the predetermined indicator is selected as the text detecting region. Therefore, in the case where there is no text detecting region on the left that is closer to the predetermined indicator, the region above the predetermined indicator is preferentially selected as the text detecting region, which can better accommodate the reading habit of the user, thereby improving the user experience.

For example, as shown in FIG. 7, one of the first region 742 that is closest to the predetermined indicator 720 and the second region 741 that is second closest to the predetermined indicator 720, i.e., the second region 741 is above the predetermined indicator 720 and the predetermined indicator 720 is between the first region 742 and the second region 741. In this case, the region 741 above the predetermined indicator 720 is selected as the text detecting region, that is, the region above the predetermined indicator 720 is preferentially selected as the text detecting region, which can better accommodate the reading habit of the user.

In step S410, if the case where one of the first region and the second region is above the predetermined indicator and the predetermined indicator is between the first region and the second region does not exist, the first region that is closest to the predetermined indicator is selected as the text detecting region.

FIG. 8 is a schematic diagram for determining a text detecting region based on the position of the predetermined indicator according to a further exemplary embodiment of the present disclosure. As shown in FIG. 8, there are a plurality of text-containing regions 841, 842, 843, 844 and 845 in an image to be detected of a text object to be detected 810. In this case, the first region 845 that is closest to a predetermined indicator 820 and the second region 843 that is second closest to the predetermined indicator 820 may be determined from the plurality of text-containing regions 841, 842, 843, 844 and 845. In the case as shown in FIG. 8, neither the condition that one of the first region 845 that is closest to the predetermined indicator 820 and the second region 843 that is second closest to the predetermined indicator 820 is on the left of the predetermined indicator 820 and the predetermined indicator 820 is between the first region 845 and the second region 843 is met, nor the condition that one of the first region 845 that is closest to the predetermined indicator 820 and the second region 843 that is second closest to the predetermined indicator 820 is above the predetermined indicator 820 and the predetermined indicator 820 is between the first region 845 and the second region 843 is met. Therefore, the first region 845 that is closest to the predetermined indicator 820 is selected as the text detecting region.

As shown in FIGS. 6 to 8 above, according to the exemplary embodiments of the present disclosure, when the text detecting region is determined based on the position of the predetermined indicator, such as a finger, the text-containing region on the left of the predetermined indicator, the text-containing region above the predetermined indicator, and the text-containing region that is closer to the predetermined indicator are preferentially selected as the text detecting region in sequence, which can better accommodate the reading habit of the user, thereby improving the user experience.

Figure 9:
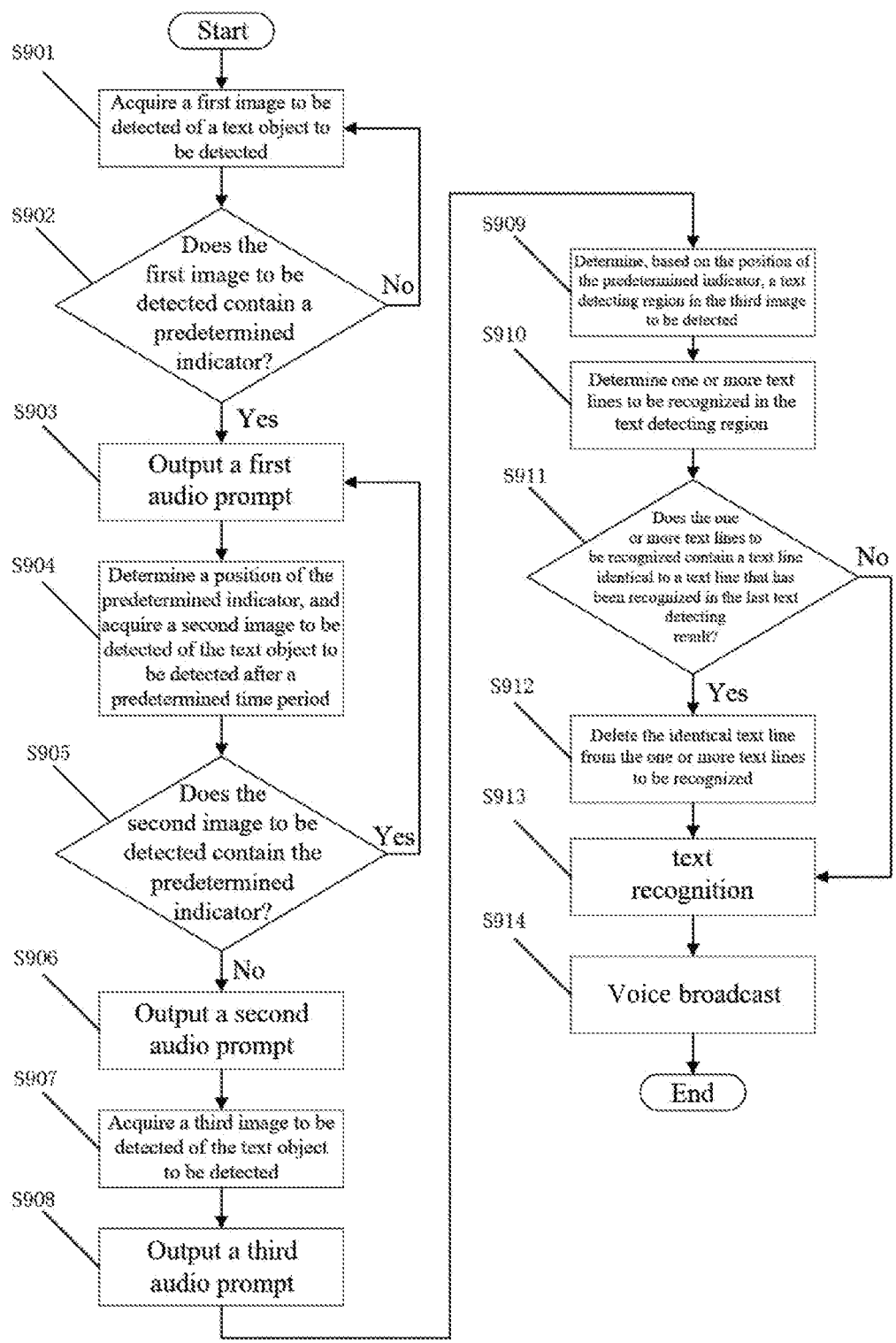
FIG. 9 is a flow chart showing a text detecting method according to another exemplary embodiment of the present disclosure.

FIG. 9 is a flow chart showing a text detecting method according to another exemplary embodiment of the present disclosure.

As shown in FIG. 9, the text detecting method according to this exemplary embodiment may include, for example, steps S901 to S914. In the exemplary text detecting method shown in FIG. 9, steps S901 and S902 may be substantially the same as steps S101 and S102 described with reference to FIG. 1, and thus are not repeatedly described herein again. As shown in FIG. 9, the text detecting method according to another exemplary embodiment of the present disclosure may further comprise step S903. In step S903, a first audio prompt is output. In other words, if the first image to be detected contains the predetermined indicator, the first audio prompt is output. For example, if the predetermined indicator is a user's finger, in the case where the first image to be detected contains the user's finger, the first audio prompt is output. The first audio prompt may be any type of prompt tone, e.g., a tick.

In step S904, a position of the predetermined indicator is determined, and a second image to be detected of the text object to be detected is acquired after a predetermined time period. The predetermined time period may be, for example, 1.5 seconds. Of course, other time periods may also be selected according to specific applications and/or demands.

In step S905, it is determined whether the second image to be detected contains the predetermined indicator. If the second image to be detected does not contain the predetermined indicator, the subsequent step S906 is executed. If the second image to be detected contains the predetermined indicator, the first audio prompt is output again. For example, if the predetermined indicator is a user's finger, it is determined whether the second image to be detected contains the user's finger. If the second image to be detected does not contain the user's finger, subsequent steps are executed. If the second image to be detected contains the user's finger, the first audio prompt, such as a tick, is output again. In other words, if the predetermined indicator, such as the user's finger, does not move away from the text object to be detected, the first audio prompt, such as a tick, will be continuously output at intervals of a predetermined time period (e.g., 1.5 seconds). A starting time of the first audio prompt is the time when the predetermined indicator, such as the finger, is detected for the first time.

As shown in FIG. 9, the text detecting method according to another exemplary embodiment of the present disclosure may further comprise step S906. In step S906, a second audio prompt is output. In other words, if the second image to be detected does not contain the predetermined indicator, the second audio prompt is output. For example, if the predetermined indicator is a user's finger, in the case where the second image to be detected does not contain the user's finger, the second audio prompt is output. The second audio prompt may be the same as or different from the first audio prompt. In addition, the second audio prompt may be any type of prompt tone, e.g., a camera focusing sound. The second audio prompt facilitates reminding the user that image information of the object to be recognized is to be acquired, and the user may maintain the stability of the image acquisition process after the audio prompt.

As shown in FIG. 9, the text detecting method according to another exemplary embodiment of the present disclosure may further comprise step S907. In step S907, a third image to be detected of the text object to be detected is acquired. According to an exemplary embodiment, the third image to be detected of the text object to be detected may have a higher resolution than the resolutions of the first and second images to be detected. For example, the resolutions of the first and second images to be detected of the text object to be detected may be lower, and the first and second images to be detected may be even preview images photographed by a camera or a photographing device. Thus, the position of the predetermined indicator may be determined by processing the first and second images to be detected with lower resolutions. Since the resolutions of the first and second images to be detected are low, there is a small amount of data upon which image processing needs to be performed, which facilitates improving the speed of text detection. Of course, the first and second images to be detected may also be photos photographed by the camera or the photographing device, instead of the preview images. After the predetermined indicator leaves the text object to be detected, the third image to be detected of the text object to be detected with a higher resolution may be acquired again by executing step S907. Correspondingly, in a subsequent step, the text detecting region is determined in the third image to be detected, based on the position of the predetermined indicator. The resolution of the third image to be detected is higher, which facilitates improving the accuracy of text detection.

As shown in FIG. 9, the text detecting method according to another exemplary embodiment of the present disclosure may further comprise step S908. In step S908, a third audio prompt is output. The third audio prompt may be any type of prompt tone. For example, the third audio prompt may be a prompt tone different from the first and second audio prompts, such as a click for prompting photographing success, which indicates that the third image to be detected of the text object to be detected has been successfully acquired. The third audio prompt can reduce the user's anxiety of waiting before recognition and broadcast, and thus improves the user experience.

According to a specific exemplary embodiment, three audio prompts, i.e., the first audio prompt, the second audio prompt, and the third audio prompt, can be output by executing steps S903 to S908. For example, if it is determined that the first image to be detected contains the user's finger, that is, the finger appears on the text object to be detected, the first audio prompt, such as the tick, may be output. If the user's finger does not move away from the text object to be detected, the first audio prompt, such as the tick, is continuously output at intervals of a predetermined time period (e.g., 1.5 seconds), wherein a starting time of the click is the time when the finger is detected for the first time. If it is determined that the second image to be detected does not contain the user's finger, that is, after the finger moves away from the text object to be detected, the second audio prompt, such as the camera focusing sound, may be output. After the third image to be detected of the text object to be detected is acquired, the third audio prompt may be output, such as the click for prompting photographing success, which indicates that the third image to be detected of the text object to be detected has been successfully acquired.

As shown in FIG. 9, the text detecting method according to another exemplary embodiment of the present disclosure may further comprise step S909. In this step, the text detecting region is determined in the third image to be detected, based on the position of the predetermined indicator. The resolution of the third image to be detected is higher, which facilitates improving the accuracy of text detection.

As shown in FIG. 9, the text detecting method according to another exemplary embodiment of the present disclosure may further comprise step S910. In this step, one or more text lines to be recognized in the text detecting region are determined. In many applications, it may be desirable to recognize texts in the determined text detecting region in addition to the text detection of the text object to be detected. Therefore, in step S910, the one or more text lines to be recognized in the text detecting region may be determined.

The exemplary method as shown in FIG. 9 may also comprise steps S911 and S912. In S911, it is determined whether the one or more text lines to be recognized contain a text line identical to a text line that has been recognized in the last text detecting result. In S912, if the one or more text lines to be recognized contain a text line identical to a text line that has been recognized in the last text detecting result, the identical text line is deleted from the one or more text lines to be recognized.

According to an exemplary embodiment, the identical text line can be deleted from the one or more text lines to be recognized, by filtering the first line. More specifically, when it is determined whether the one or more text lines to be recognized contain a text line identical to a text line that has been recognized in the last text detecting result, starting from the first line of the text lines that have been recognized in the last text detecting result, the first line of one or more text lines to be recognized is compared with each of the text lines that have been recognized in the last text detecting result, line by line. If the first line of the one or more text lines to be recognized is different from each of the text lines that have been recognized in the last text detecting result, the last line of the one or more text lines to be recognized is further compared with each of the text lines that have been recognized in the last text detecting result line by line, and if the last line of the one or more text lines to be recognized is different from each of the text lines that have been recognized in the last text detecting result, it is determined that the one or more text lines to be recognized do not contain a text line identical to the text line that has been recognized in the last text detecting result. In this case, text recognition is performed on all of the one or more text lines to be recognized, that is, the one or more text lines to be recognized are recognized line by line starting from the first line.

If in the process of comparing, starting from the first line of the text lines that have been recognized in the last text detecting result, the first line of the one or more text lines to be recognized with each of the text lines that have been recognized in the last text detecting result line by line, it is found that the first line of the one or more text lines to be recognized is different from each of the text lines that have been recognized in the last text detecting result, while in the process of further comparing the last line of the one or more text lines to be recognized with each of the text lines that have been recognized in the last text detecting result line by line, it is found that the last line of the one or more text lines to be recognized is identical to a certain line, e.g., an Nth line of the text lines that have been recognized in the last text detecting result, it is determined that the one or more text lines to be recognized contain a text line identical to the text line that has been recognized in the last text detecting result. In this case, the identical text line is deleted from the one or more text lines to be recognized. That is, the (M-N+1)th line to the last line of the one or more text lines to be recognized are deleted, where M is the number of the one or more text lines to be recognized. Correspondingly, during text recognition, if there is still an unrecognized text line after the identical text line(s) is deleted from the one or more text lines to be recognized, starting from the first line of the one or more text lines to be recognized, the first line to the (M-N)th line are recognized line by line. If there is no unrecognized text line after the identical text line(s) is deleted from the one or more text lines to be recognized, the recognition is given up, and the first image to be detected of the text object to be detected may be reacquired.

If in the process of comparing, starting from the first line of the text lines that have been recognized in the last text detecting result, the first line of the one or more text lines to be recognized with each of the text lines that have been recognized in the last text detecting result line by line, it is found that the first line of the one or more text lines to be recognized is identical to a certain line, e.g., an Nth line of the text lines that have been recognized in the last text detecting result, it is determined that the one or more text lines to be recognized contain a text line identical to the text line that has been recognized in the last text detecting result. In this case, the identical text line is deleted from the one or more text lines to be recognized. That is, the first line to the (M-N+1)th line of the one or more text lines to be recognized are deleted, where M is the number of the one or more text lines to be recognized. Correspondingly, during text recognition, if there is still an unrecognized text line after the identical text line(s) is deleted from the one or more text lines to be recognized, the one or more text lines to be recognized are recognized line by line starting from the (M-N+2)th line. If there is no unrecognized text line after the identical text line(s) is deleted from the one or more text lines to be recognized, the recognition is given up, and the first image to be detected of the text object to be detected may be reacquired.

For example, it is assumed that the number of the text lines that have been recognized in the last text detecting result and the number of the one or more text lines to be recognized are both five. First, starting from the first line of the text lines that have been recognized in the last text detecting result, the first line of the five text lines to be recognized is compared with each of the text lines that have been recognized in the last text detecting result line by line. If the first line of the five text lines to be recognized is different from each of the text lines that have been recognized in the last text detecting result, it is determined that the five text lines to be recognized do not contain a text line identical to the text line that has been recognized in the last text detecting result. In this case, text recognition is performed on all of the five text lines to be recognized, that is, the five text lines to be recognized are recognized line by line starting from the first line till the fifth line.

If in the process of comparing, starting from the first line of the text lines that have been recognized in the last text detecting result, the first line of the five text lines to be recognized with each of the five text lines that have been recognized in the last text detecting result line by line, it is found that the first line of the five text lines to be recognized is identical to a certain line, e.g., the second line of the text lines that have been recognized in the last text detecting result, it is determined that the five text lines to be recognized contain a text line identical to the text line that has been recognized in the last text detecting result. In this case, the identical text line is deleted from the five text lines to be recognized. That is, the first line to the fourth line (i.e., the (5-2+1)th line) of the five text lines to be recognized are deleted. Accordingly, the five text lines to be recognized are recognized line by line starting from the fifth line (i.e., the (5-2+2)th line).

If in the process of comparing, starting from the first line of the text lines that have been recognized in the last text detecting result, the first line of the five text lines to be recognized with each of the five text lines that have been recognized in the last text detecting result line by line, it is found that the first line of the five text lines to be recognized is identical to a certain line, e.g., the first line of the text lines that have been recognized in the last text detecting result, it is determined that the five text lines to be recognized contain a text line identical to the text line that has been recognized in the last text detecting result. In this case, the identical text line is deleted from the five text lines to be recognized. That is, the first line to the fifth line (i.e., the (5-1+1)th line) of the five text lines to be recognized are deleted. In this case, there is no unrecognized text line after the identical text line(s) is deleted from the one or more text lines to be recognized, and therefore, the recognition is given up, and the first image to be detected of the text object to be detected may be reacquired.

By executing steps S911 and S912, the deletion of identical text lines from two consecutive text detecting results which are temporally adjacent can facilitate the user in automatically filtering out the identical text lines. Therefore, the identical text content that appears during subsequent text recognition may be reduced or eliminated, which facilitates improving the efficiency of text detection and recognition and enhancing the user experience. Further, the deletion of the identical text line(s) from the one or more text lines to be recognized by filtering the first line can efficiently filter out the identical text line(s).

After the text lines to be recognized are determined, the exemplary method as shown in FIG. 9 may further comprise steps S913 and S914. In step S913, text recognition is performed on texts in the already determined one or more text lines to be recognized. Moreover, in step S914, the recognized text content can be broadcast in the form of voice, which may be particularly advantageous for some users, such as users with visual impairment and/or dyslexia.

Figure 10:
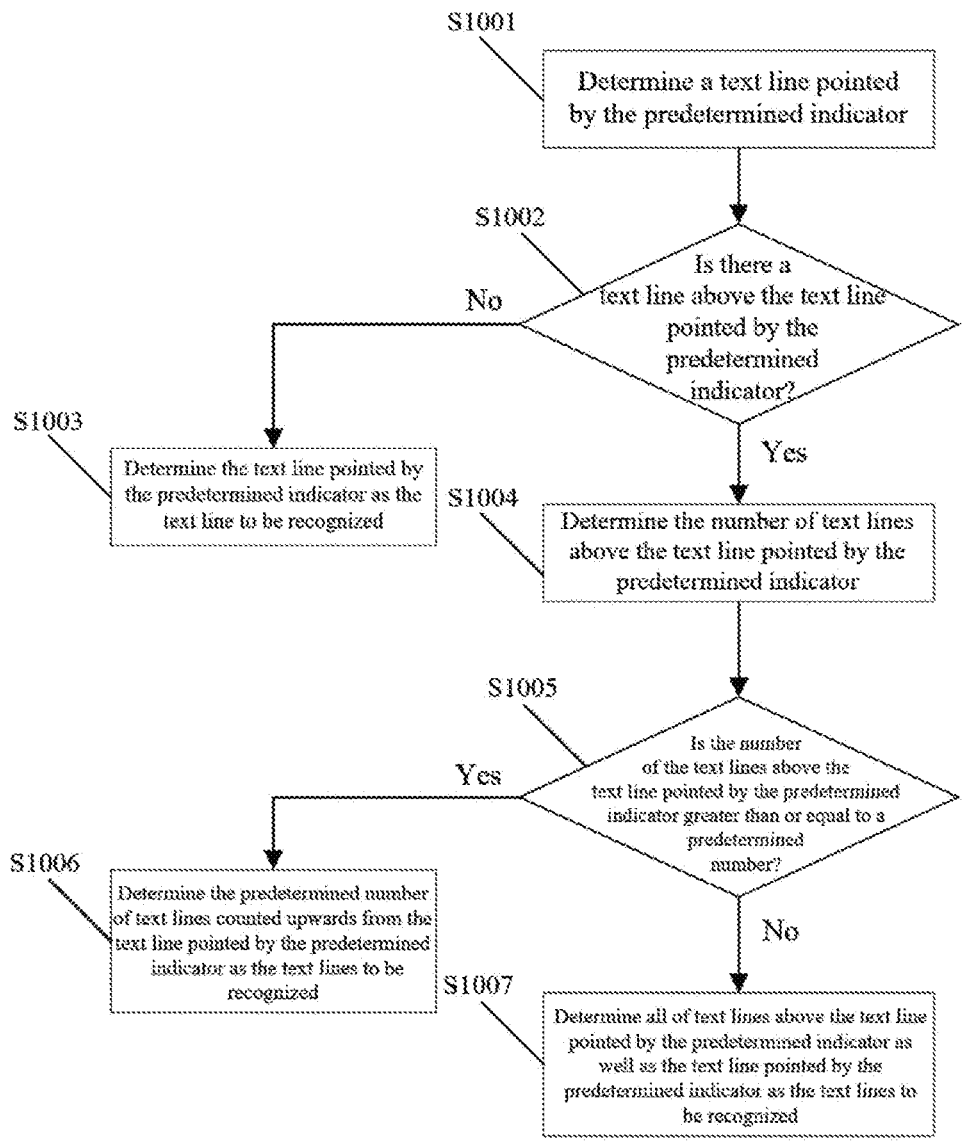
FIG. 10 is a flow chart showing a method for determining one or more text lines to be recognized in a text detecting region according to an exemplary embodiment of the present disclosure.

FIG. 10 is a flow chart showing a method for determining one or more text lines to be recognized in a text detecting region according to an exemplary embodiment of the present disclosure.

As shown in FIG. 10, in step S1001, a text line pointed by a predetermined indicator is determined. The text line pointed by the predetermined indicator may be determined by a mutual positional relationship between the indicator and the text line. For example, according to an exemplary embodiment, determining the text line pointed by the predetermined indicator may comprise: determining whether there is an overlap between the position of the predetermined indicator and one or more text lines in the text detecting region; determining, if there is an overlap between the position of the predetermined indicator and the one or more text lines in the text detecting region, the topmost text line of the one or more overlapping text lines as the text line pointed by the predetermined indicator; and determining, if there is no overlap between the position of the predetermined indicator and the text lines in the text detecting region, the text line located above the predetermined indicator and closest to the predetermined indicator as the text line pointed by the predetermined indicator. In some cases, the predetermined indicator, such as the finger, may not be on a text line, but in a blank region between the upper and lower text lines or next to a text line. The corresponding selection of a text line according to an overlapping relationship between the position of the predetermined indicator and the text lines can determine, to some extent, the text line that the user desires to select, thereby improving the user experience.

In step S1002, it is determined whether there is a text line above the text line pointed by the predetermined indicator. Moreover, in step S1003, if there is no text line above the text line pointed by the predetermined indicator, the text line pointed by the predetermined indicator is determined as a text line to be recognized. In some cases, there may be no text line above the text line pointed by the predetermined indicator. For example, the text line pointed may be the topmost text line in the text detecting region. Therefore, in the case where there is no text line above the text line pointed by the predetermined indicator, the text line pointed by the predetermined indicator itself, for example, may be determined as the text line to be recognized.

In step S1004, the number of text lines above the text line pointed by the predetermined indicator is determined. In step S1005, it is determined whether the number of the text lines above the text line pointed by the predetermined indicator is greater than or equal to a predetermined number. In step S1006, if the number of the text lines above the text line pointed by the predetermined indicator is greater than or equal to the predetermined number, the predetermined number of text lines counted upwards from the text line pointed by the predetermined indicator are determined as the text lines to be recognized. In step S1007, if the number of the text lines above the text line pointed by the predetermined indicator is less than the predetermined number, all of text lines above the text line pointed by the predetermined indicator as well as the text line pointed by the predetermined indicator are determined as the text lines to be recognized.

In steps S1004 to S1007, not all of the text lines above the text line pointed by the predetermined indicator are always determined as the text lines to be recognized. When the number of the text lines above the text line pointed by the predetermined indicator is greater than or equal to the predetermined number, only the predetermined number of text lines counted upwards from the text line pointed by the predetermined indicator are determined as the text lines to be recognized.

Figure 11:
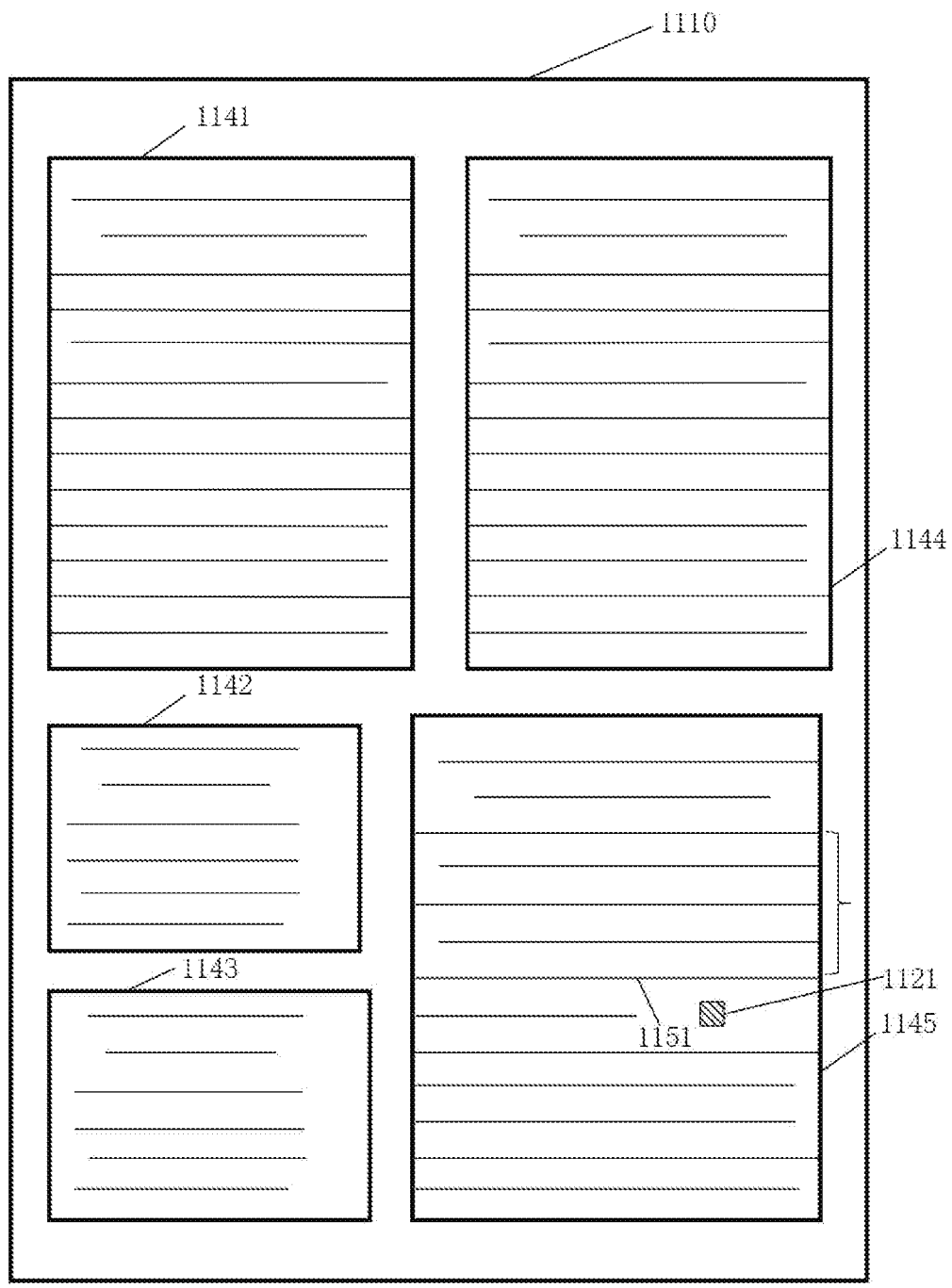
FIG. 11 is a schematic diagram showing the determination of one or more text lines to be recognized in a text detecting region according to an exemplary embodiment of the present disclosure.

For example, FIG. 11 is a schematic diagram showing the determination of one or more text lines to be recognized in the text detecting region according to an exemplary embodiment of the present disclosure. As shown in FIG. 11, an image to be detected of a text object to be detected, such as a book or a newspaper 1110, comprises a plurality of text-containing regions 1141, 1142, 1143, 1144 and 1145. Based on a position 1121 of a predetermined indicator, the text-containing region 1145 is determined as the text detecting region. In the text detecting region 1145, because there is no overlap between the position 1121 of the predetermined indicator and text lines in the text detecting region, a text line 1151 located above the predetermined indicator and closest to the position 1121 of the predetermined indicator is determined as the text line pointed by the predetermined indicator. It is assumed that the predetermined number of the text lines above the text line pointed by the predetermined indicator is determined to be five. Because the number of the text lines above the text line 1151 pointed by the predetermined indicator is greater than five, five text lines counted upwards from the text line 1151 pointed by the predetermined indicator are determined as the text lines to be recognized, i.e., the text lines shown in brackets in FIG. 11.

It can be seen that text lines for local recognition can be determined by the exemplary method for determining the one or more text lines to be recognized in the text detecting region as shown in FIG. 10. Because the determined text lines for local recognition are likely to be the text content on which the user focuses, the user experience can be enhanced. On the other hand, because detection or recognition is not always performed from the first line of a text paragraph, repeated detection and recognition of the text content can be reduced or avoided.

An aspect of the present disclosure may comprise a reading assisting device, comprising: a sensor (e.g., a camera, a photographing device, etc.) configured to capture an image of the text object to be detected described above; and a processor chip circuit, wherein the processor chip circuit comprises a circuit unit configured to execute the steps of any of the methods described above. According to some embodiments, the processor chip circuit may further comprise a circuit unit configured to convert texts in a text line to be recognized into sound according to a text detecting result.

The reading assisting device may also be implemented by software, and may comprise: a processor; and a memory for storing a program, the program comprising instructions that, when executed by the processor, cause the processor to execute any of the methods described above. According to some embodiments, the program may further comprise instructions for converting, when executed by the processor, texts in a text line to be recognized into sound according to a text detecting result.

By means of the reading assisting device, a visual impaired user is able to "read", as a normal vision reader, conventional reading materials (e.g., books, magazines, etc.) using a similar reading posture. During the course of "reading", the reading assisting device may perform text detection, then automatically converts texts in a text line to be recognized into sound according to a text detecting result according to the methods in the foregoing embodiments, and outputs the sound through an output apparatus, such as a speaker or a headphone, for the user to listen.

An aspect of the present disclosure may include a non-transitory computer readable storage medium storing a program, the program comprising instructions that, when executed by a processor of an electronic device, cause the electronic device to execute any of the methods.

Figure 12:
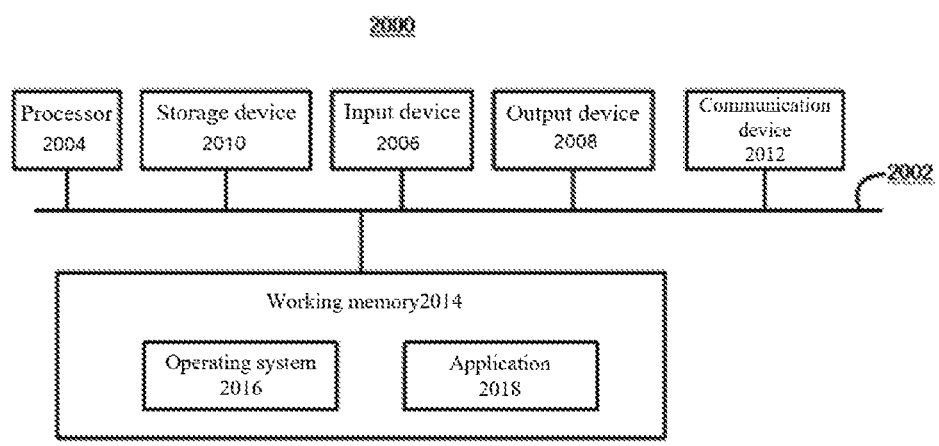
FIG. 12 is a structural block diagram showing an exemplary computing device that can be applied to exemplary embodiments.

Referring to FIG. 12, a computing device 2000 is now described, which is an example of a hardware device that can be applied to various aspects of the present disclosure. The computing device 2000 may be any machine configured to perform processing and/or computing, which may be, but is not limited to, a workstation, a server, a desktop computer, a laptop computer, a tablet computer, a personal digital assistant, a smart phone, an on-board computer or any combination thereof. The reading assisting device may be implemented, in whole or at least in part, by the computing device 2000 or a similar device or system.

The computing device 2000 may include elements in connection with a bus 2002 or in communication with a bus 2002 (possibly via one or more interfaces). For example, the computing device 2000 may include the bus 2002, one or more processors 2004 (which may be used to implement the processor included in the reading assisting device), one or more input devices 2006, and one or more output devices 2008. The one or more processors 2004 may be any type of processors, and may include, but are not limited to, one or more general-purpose processors and/or one or more dedicated processors (e.g., special processing chips). The input device 2006 may be any type of device capable of inputting information to the computing device 2000, and may include, but is not limited to, a sensor (e.g., the sensor for capturing an image as described above), a mouse, a keyboard, a touch screen, a microphone and/or a remote controller. The output device 2008 (e.g., the output apparatus that may be used to output the sound converted from the texts as described above) may be any type of device capable of presenting information, and may include, but is not limited to, a display, a speaker, a video/audio output terminal, a vibrator and/or a printer. The computing device 2000 may also include a non-transitory storage device 2010 or be connected to a non-transitory storage device 2010. The non-transitory storage device (which may be, for example, used for implementing the non-transitory computer readable storage medium as described above) may be non-transitory and may be any storage device capable of implementing data storage, and may include, but is not limited to, a disk drive, an optical storage device, a solid-state memory, a floppy disk, a flexible disk, a hard disk, a magnetic tape, or any other magnetic medium, an optical disk or any other optical medium, a read-only memory (ROM), a random access memory (RAM), a cache memory and/or any other memory chip or cartridge, and/or any other non-transitory medium from which a computer can read data, instructions and/or codes.

The non-transitory storage device 2010 may be detached from an interface. The non-transitory storage device 2010 may have data/programs (including instructions)/codes for implementing the methods and steps. The computing device 2000 may also include a communication device 2012. The communication device 2012 may be any type of device or system that enables communication with an external device and/or a network, and may include, but is not limited to, a modem, a network card, an infrared communication device, a wireless communication device and/or a chipset, e.g., a Bluetooth device, a 1302.11 device, a WiFi device, a WiMax device, a cellular communication device and/or the like.

The computing device 2000 may also include a working memory 2014 (which may be used to implement the memory included in the reading assisting device), which may be any type of working memory capable of storing programs (including instructions) and/or data useful to the working of the processor 2004, and may include, but is not limited to, a random access memory and/or a read-only memory.

Software elements (programs) may be located in the working memory 2014, and may include, but is not limited to, an operating system 2016, one or more applications 2018, drivers, and/or other data and codes. The instructions for executing the methods and steps may be included in the one or more applications 2018. Executable codes or source codes of the instructions of the software elements (programs) may be stored in a non-transitory computer readable storage medium (e.g., the storage device 2010), and may be stored in the working memory 2014 when executed (may be compiled and/or installed). The executable codes or source codes of the instructions of the software elements (programs) may also be downloaded from a remote location.

When the computing device 2000 shown in FIG. 12 is applied to an embodiment of the present disclosure, the memory 2014 may store program codes for executing the flow chart of the present disclosure and/or an image to be recognized containing text content. The applications 2018 may include optical text recognition applications (such as Adobe), voice conversion applications, editable text processing applications, etc., that are provided by a third party. The input device 2006 may be a sensor for capturing an image of a text object to be detected. The output device 2008 is, for example, a speaker or a headphone for speech broadcast. The processor 2004 is configured to execute, according to the program codes in the memory 2014, the steps of the methods according to various aspects of the present disclosure.

It should also be appreciated that various variations may be made according to specific requirements. For example, custom hardware may also be used, and/or specific elements (i.e., the processor chip circuit) may be implemented in hardware, software, firmware, middleware, microcodes, hardware description languages, or any combination thereof. For example, some or all of the disclosed methods and devices (e.g., the circuit units in the processor chip circuit) may be implemented by programming hardware (e.g., a programmable logic circuit including a field programmable gate array (FPGA) and/or a programmable logic array (PLA)) in an assembly language or a hardware programming language (such as VERILOG, VHDL, C++) by using the logic and algorithm in consistent with the present disclosure.

It should also be appreciated that the components of the computing device 2000 may be distributed over a network. For example, some processing may be executed by one processor while other processing may be executed by another processor away from the one processor. Other components of the computing system 2000 may also be similarly distributed. In this way, the computing device 2000 may be interpreted as a distributed computing system that performs processing at multiple positions.

Although the embodiments or examples of the present disclosure have been described with reference to the accompanying drawings, it should be appreciated that the methods, systems and devices described above are merely exemplary embodiments or examples, and the scope of the present disclosure is not limited by the embodiments or examples, but only defined by the appended authorized claims and equivalent scopes thereof. Various elements in the embodiments or examples may be omitted or substituted by equivalent elements thereof. Moreover, the steps may be executed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A reading assisting device, comprising:
   an image sensor for capturing a first image to be detected and a second image to be detected, of a text object to be detected;
   a processor; and
   a memory for storing a program, the program comprising instructions that, when executed by the processor, cause the processor to:
   acquire the first image to be detected, captured by the image sensor, of the text object to be detected;
   determine whether the first image to be detected contains a predetermined indicator;
   determine, when the first image to be detected contains the predetermined indicator, a position of the predetermined indicator, and acquire the second image to be detected, captured by the image sensor, of the text object to be detected;
   determine whether the second image to be detected contains the predetermined indicator; and
   determine, when the second image to be detected does not contain the predetermined indicator, a text detecting region based on the determined position of the predetermined indicator,
   wherein the program further comprises instructions that, when executed by the processor, cause the processor to:
   output a second audio prompt and acquire a third image to be detected of the text object to be detected, before determining, when the second image to be detected does not contain the predetermined indicator, the text detecting region based on the determined position of the predetermined indicator,
   wherein a resolution of the third image to be detected is higher than a resolution of the first image to be detected and a resolution of the second image to be detected.

2. The reading assisting device of claim 1, wherein the program further comprises instructions that, when executed by the processor, cause the processor to:
   determine one or more text lines to be recognized in the text detecting region.

3. The reading assisting device of claim 2, wherein determining the one or more text lines to be recognized in the text detecting region comprises: determining a text line pointed by the predetermined indicator.

4. The reading assisting device of claim 3, wherein the program further comprises instructions that, when executed by the processor, cause the processor to:

determine, when no text line exists above the text line pointed by the predetermined indicator, the text line pointed by the predetermined indicator as the text line to be recognized;

determine, when a text line exists above the text line pointed by the predetermined indicator, the number of text lines above the text line pointed by the predetermined indicator; and determine, when the number of the text lines above the text line pointed by the predetermined indicator is greater than or equal to a predetermined number, the predetermined number of text lines counted upwards from the text line pointed by the predetermined indicator as the text lines to be recognized, otherwise, determine all of the text lines above the text line pointed by the predetermined indicator as well as the text line pointed by the predetermined indicator as the text lines to be recognized.

5. The reading assisting device of claim 2, wherein the program further comprises instructions that, when executed by the processor, cause the processor to:

determine whether the one or more text lines to be recognized contain a text line identical to a text line that has been recognized in the last text detecting result; and delete, when the one or more text lines to be recognized contain a text line identical to a text line that has been recognized in the last text detecting result, the identical text line from the one or more text lines to be recognized.

6. A computer-implemented text detecting method, comprising the following steps executed by a processor:

acquiring a first image to be detected, of a text object to be detected;

determining whether the first image to be detected contains a predetermined indicator;

determining, when the first image to be detected contains the predetermined indicator, a position of the predetermined indicator, and acquiring a second image to be detected of the text object to be detected;

determining whether the second image to be detected contains the predetermined indicator; and determining, when the second image to be detected does not contain the predetermined indicator, a text detecting region based on the determined position of the predetermined indicator, wherein before determining, when the second image to be detected does not contain the predetermined indicator, the text detecting region based on the determined position of the predetermined indicator, the method further comprises:

outputting a second audio prompt; and acquiring a third image to be detected of the text object to be detected, wherein a resolution of the third image to be detected is higher than a resolution of the first image to be detected and a resolution of the second image to be detected.

7. The text detecting method of claim 6, wherein after determining the text detecting region based on the determined position of the predetermined indicator, the method further comprises:

determining one or more text lines to be recognized in the text detecting region.

8. The text detecting method of claim 7, wherein determining the one or more text lines to be recognized in the text detecting region comprises: determining a text line pointed by the predetermined indicator.

9. The text detecting method of claim 8, wherein after determining the text line pointed by the predetermined indicator, the method further comprises:

determining, when no text line exists above the text line pointed by the predetermined indicator, the text line pointed by the predetermined indicator as the text line to be recognized.

10. The text detecting method of claim 9, wherein after determining the text line pointed by the predetermined indicator, the method further comprises:

determining, when a text line exists above the text line pointed by the predetermined indicator, the number of text lines above the text line pointed by the predetermined indicator; and determining, when the number of the text lines above the text line pointed by the predetermined indicator is greater than or equal to a predetermined number, the predetermined number of text lines counted upwards from the text line pointed by the predetermined indicator as the text lines to be recognized, otherwise, determining all of text lines above the text line pointed by the predetermined indicator as well as the text line pointed by the predetermined indicator as the text lines to be recognized.

11. The text detecting method of claim 8, wherein determining the text line pointed by the predetermined indicator comprises:

determining whether there is an overlap between the position of the predetermined indicator and one or more text lines in the text detecting region;

determining, when an overlap exists between the position of the predetermined indicator and one or more text lines in the text detecting region, the topmost text line of the one or more overlapping text lines as the text line pointed by the predetermined indicator; and determining, when no overlap exists between the position of the predetermined indicator and the text lines in the text detecting region, the text line located above the predetermined indicator and closest to the predetermined indicator as the text line pointed by the predetermined indicator.

12. The text detecting method of claim 7, wherein after determining the one or more text lines to be recognized in the text detecting region, the method further comprises:

determining whether the one or more text lines to be recognized contain a text line identical to a text line that has been recognized in the last text detecting result; and deleting, when the one or more text lines to be recognized contain a text line identical to a text line that has been recognized in the last text detecting result, the identical text line from the one or more text lines to be recognized.

13. The text detecting method of claim 6, wherein determining the text detecting region based on the determined position of the predetermined indicator comprises:

determining a position of each of one or more text lines in the third image to be detected;

obtaining, based on the position of each of the one or more text lines, one or more text-containing regions in the third image to be detected; and determining, based on the determined position of the predetermined indicator, the text detecting region from the one or more text-containing regions.

14. The text detecting method of claim 13, wherein determining, based on the determined position of the predetermined indicator, the text detecting region from the one or more text-containing regions comprises: selecting, when the one or more text-containing regions comprise a region where the predetermined indicator is located, the region as the text detecting region.

15. The text detecting method of claim 13, wherein determining, based on the determined position of the predetermined indicator, the text detecting region from the one or more text-containing regions comprises: executing, when none of the one or more text-containing regions comprise the predetermined indicator, the following steps to determine the text detecting region:
  selecting, when the one or more text-containing regions comprise only one text-containing region, the only one text-containing region as the text detecting region;
  determining, when the one or more text-containing regions comprise a plurality of text-containing regions, a first region that is closest to the predetermined indicator and a second region that is second closest to the predetermined indicator from the plurality of text-containing regions;
  selecting, when one of the first region and the second region is to the left of the predetermined indicator and the predetermined indicator being between the first region and the second region, the region on the left of the predetermined indicator as the text detecting region, otherwise, determining whether one of the first region and the second region is above the predetermined indicator and the predetermined indicator is between the first region and the second region; and
  selecting, when one of the first region and the second region is above the predetermined indicator and the predetermined indicator being between the first region and the second region, the region above the predetermined indicator as the text detecting region, otherwise, selecting the first region as the text detecting region.

16. The text detecting method of claim 6, wherein determining, when the first image to be detected contains the predetermined indicator, the position of the predetermined indicator and acquiring the second image to be detected of the text object to be detected comprises:
  determining, when the first image to be detected contains the predetermined indicator, the position of the predetermined indicator, and after determining the position of the predetermined indicator, acquiring the second image to be detected of the text object to be detected after a predetermined time period.

17. The text detecting method of claim 6, further comprising:
  outputting a first audio prompt when the first image to be detected contains the predetermined indicator.

18. The text detecting method of claim 6, wherein determining the text detecting region based on the determined position of the predetermined indicator comprises:
  determining, based on the determined position of the predetermined indicator, the text detecting region in the third image to be detected.

19. A non-transitory computer readable storage medium storing a program, the program comprising instructions that, when executed by a processor of an electronic device, cause the electronic device to:
  acquire a first image to be detected, of a text object to be detected;
  determine whether the first image to be detected contains a predetermined indicator;
  determine, when the first image to be detected contains the predetermined indicator, a position of the predetermined indicator, and acquire a second image to be detected of the text object to be detected;
  determine whether the second image to be detected contains the predetermined indicator; and
  determine, when the second image to be detected does not contain the predetermined indicator, a text detecting region based on the determined position of the predetermined indicator,
  wherein the program further comprises instructions that, when executed by the processor, cause the electronic device to:
  output a second audio prompt and acquire a third image to be detected of the text object to be detected, before determining, when the second image to be detected does not contain the predetermined indicator, the text detecting region based on the determined position of the predetermined indicator,
  wherein a resolution of the third image to be detected is higher than a resolution of the first image to be detected and a resolution of the second image to be detected.

* * * * *